United States Patent
Denn

(10) Patent No.: US 12,165,541 B2
(45) Date of Patent: Dec. 10, 2024

(54) AUGMENTED REALITY TRAINING SYSTEMS AND METHODS

(71) Applicant: Havik Solutions LLC, San Diego, CA (US)

(72) Inventor: Bradley Denn, San Diego, CA (US)

(73) Assignee: Havik Solutions LLC, San Diego, CA (US)

(*) Notice: Subject to any disclaimer, the term of this patent is extended or adjusted under 35 U.S.C. 154(b) by 242 days.

(21) Appl. No.: 16/859,965

(22) Filed: Apr. 27, 2020

(65) Prior Publication Data

US 2021/0335145 A1 Oct. 28, 2021

(51) Int. Cl.
G09B 9/00 (2006.01)
G02B 27/01 (2006.01)
G06T 19/00 (2011.01)
G09B 9/08 (2006.01)

(52) U.S. Cl.
CPC ............ *G09B 9/003* (2013.01); *G02B 27/017* (2013.01); *G06T 19/006* (2013.01); *G09B 9/085* (2013.01); *G02B 2027/0178* (2013.01)

(58) Field of Classification Search
CPC ........ G09B 9/003; G09B 9/085; G09B 9/006; G02B 27/017; G02B 2027/0141; G02B 2027/0178; G06T 19/006; G06T 2219/024
See application file for complete search history.

(56) References Cited

U.S. PATENT DOCUMENTS

| | | |
|---|---|---|
| 5,815,411 A | 9/1998 | Ellenby et al. |
| 5,850,352 A | 12/1998 | Moezzi et al. |
| 6,175,343 B1 | 1/2001 | Mitchell et al. |
| 6,204,973 B1 | 3/2001 | Holden |
| 6,330,356 B1 | 12/2001 | Sundareswaran et al. |
| 6,408,257 B1 | 6/2002 | Harrington et al. |
| 6,842,175 B1 | 1/2005 | Schmalstieg et al. |

(Continued)

FOREIGN PATENT DOCUMENTS

| | | |
|---|---|---|
| KR | 100542370 B1 | 1/2006 |
| WO | 2017145155 A1 | 8/2017 |

OTHER PUBLICATIONS

Christopher Wickens et al., Developing and Evaluating an Augmented Reality Interface to Assist the Joint Tactical Air Controller by Applying Human Performance Models, Sep. 2018, In Proceedings of the Human Factors and Ergonomics Society Annual Meeting Sep. 2018, vol. 62, No. 1, pp. 686-690. (Year: 2018).*

(Continued)

*Primary Examiner* — Jeffery A Brier
(74) *Attorney, Agent, or Firm* — Fenwick & West LLP

(57) ABSTRACT

A system is configured to provide Joint Terminal Attack Controller (JTAC) training using one or more of augmented reality (AR) devices, virtual reality (VR) devices, or other devices. The system may generate one or more AR elements (such as one or more of an enemy combatant, an aerial device, an ordnance, a ground vehicle, or a structure). The system may produce AR data that can be provided to one or more AR headsets and may produce VR scene data corresponding to the AR data that can be provided to one or more VR headsets. Additionally, the system may detect a cap or cover on a device, determine data related to the device from the cap, and present visual data superimposed over the cap based on the determined data.

15 Claims, 23 Drawing Sheets

(56) References Cited

U.S. PATENT DOCUMENTS

| | | |
|---|---|---|
| 6,891,518 B2 | 5/2005 | Sauer et al. |
| 6,919,867 B2 | 7/2005 | Sauer |
| 7,002,551 B2 | 2/2006 | Azuma |
| 7,046,214 B2 | 5/2006 | Ebersole et al. |
| 7,088,364 B2 | 8/2006 | Lantin |
| 7,176,936 B2 | 2/2007 | Sauer et al. |
| 7,190,331 B2 | 3/2007 | Genc et al. |
| 7,605,826 B2 | 10/2009 | Sauer |
| 7,714,895 B2 | 5/2010 | Pretlove et al. |
| 8,947,455 B2 | 2/2015 | Friesen |
| 9,092,896 B2 | 7/2015 | Scavezze et al. |
| 9,626,805 B2 | 4/2017 | Lampotang et al. |
| 9,717,981 B2 | 8/2017 | Robbins et al. |
| 9,939,650 B2 | 4/2018 | Smith et al. |
| 9,995,936 B1 | 6/2018 | Macannuco et al. |
| 10,010,379 B1 | 7/2018 | Gibby et al. |
| 10,192,358 B2 | 1/2019 | Robbins |
| 10,223,835 B2 | 3/2019 | Cashen et al. |
| 2003/0080976 A1 | 5/2003 | Satoh |
| 2003/0080979 A1 | 5/2003 | Satoh et al. |
| 2004/0189675 A1* | 9/2004 | Pretlove ............... G06F 3/1454 |
| | | 348/E7.087 |
| 2006/0176242 A1 | 8/2006 | Jamaraz et al. |
| 2007/0279435 A1 | 12/2007 | Ng et al. |
| 2008/0266323 A1 | 10/2008 | Biocca et al. |
| 2010/0313146 A1 | 12/2010 | Nielsen et al. |
| 2014/0022283 A1 | 1/2014 | Chan et al. |
| 2016/0349509 A1 | 12/2016 | Anier et al. |

OTHER PUBLICATIONS

Katherine H. Crawford, Office of Naval Research, Is this real or just fantasy? ONR Augmented-Reality Initiative progresses, Aug. 23, 2012, https://phys.org/news/2012-08-real-fantasy-onr-augmented-reality.html, 3 pages. (Year: 2012).*

Wang, et al., "Augmented Reality Navigation with Automatic Marker-Free Image Registration Using 3-D Image Overlay for Dental Surgery", IEEE Transactions on Biomedical Engineering, vol. 61, No. 4, Apr. 2014, pp. 1295-1304.

* cited by examiner

1300

2100

AUGMENTED REALITY TRAINING SYSTEMS AND METHODS

FIELD

The present disclosure is generally related to training systems, and more particularly, to augmented reality training systems configured to teach a joint terminal attack controller (JTAC) and to practice battlefield coordination between the JTAC and others.

BACKGROUND

Conventionally, training for joint operations may include building or otherwise providing a facility designed to simulate the environment in which a particular operation will take place. Further, such training can present a number of disadvantages, including safety risks, unrealistic simulations, high costs in terms of munitions and fuel consumption, and so on.

SUMMARY

Embodiments of virtual reality (VR) and augmented reality (AR) systems are described below that can be configured to provide joint terminal attack controller (JTAC) training for individuals to learn to direct the action of combat aircraft in close air support and other offensive air operations from a forward position. The system may include a computing device configured to communicate with a headset and optionally one or more components that can be worn or carried by a user, such as smoke bombs, binoculars, spotting scopes, laser rangefinders, weapons, communication devices, other devices, notebooks, other items, and so on. In some implementations, the system may be configured to teach fundamental principles and provide guidance to plan, coordinate, and execute close air support during joint operations. In some aspects, the system may be configured to provide training in releasing ordnance, landing procedures, supply drops, surveillance, reconnaissance, airspace deconfliction (between multiple aircraft), other training, or any combination thereof.

In some implementations, the system may include a headset (such as a virtual reality (VR) headset, smart glasses, other devices, or any combination thereof), which can be a standalone unit that is not tethered to a computing device, such as a laptop, desktop computer, or other computing device. The headset can be communicatively coupled to a computing device by a wireless transceiver and can be configured to receive information for display on the headset from the computing device via a wireless communications link. In some implementations, a first user may wear a backpack computing device communicatively coupled to the headset, and a second user may view the VR or AR scene at a screen or monitor of a second computing device.

In other implementations, a system may include a computing device and one or more VR headsets or AR headsets configured to communicate with the computing device. The computing device may be configured to orchestrate a training simulation, which may be presented to the user via the one or more VR headsets or AR headsets.

In still other embodiments, a training system may include at least one transceiver configured to communicate with one or more virtual reality devices through a wired or wireless communications link. The devices may include one or more of AR devices or VR devices. The training system may further include a processor coupled to the at least one transceiver and a memory accessible to the processor and configured to store data. The memory may store instructions that, when executed, cause the processor to present one or more of a VR scene or AR elements within an AR scene to the one or more devices according to a selected perspective of at least one user. The instructions may further cause the processor to selectively present one or more training elements within the VR scene or the AR scene, the one or more training elements may include at least one of an enemy combatant, an aerial device, an ordnance, a ground vehicle, and a structure. Additionally, the instructions may cause the processor to present activity within the VR scene or the AR scene to train the user to become a Joint Terminal Attack Controller.

In some implementations, a system is configured to provide Joint Terminal Attack Controller (JTAC) training using one or more of augmented reality (AR) devices, virtual reality (VR) devices, or other devices. The system may generate one or more AR elements (such as one or more of an enemy combatant, an aerial device, an ordnance, a ground vehicle, or a structure). The system may produce AR data that can be provided to one or more AR headsets and may produce VR scene data corresponding to the AR data that can be provided to one or more VR headsets. Additionally, the system may detect a cap or cover on a device, determine data related to the device from the cap, and present visual data superimposed over the cap based on the determined data.

In some implementations, a training system may comprise a communications interface, a processor coupled to the communications interface, and a memory accessible to the processor and configured to store data and instructions. The instructions may cause the processor to determine a training scene including one or more of an enemy combatant, a structure, and a vehicle. The instructions may cause the processor to determine first device data associated with the first device. The first device data may include one or more of first position data, first orientation data, and first attitude data of the first device relative to the training scene. The instructions may cause the processor to determine first image data based on the first device data. The first image data may include the training scene including virtual reality (VR) terrain data. The instructions may also cause the processor to determine second device data associated with the second device. The second device data may include one or more of second position data, second orientation data, and second attitude data of the second device relative to the training scene. The instructions may cause the processor to determine second image data based on the second device data including one or more images for superimposition over real terrain and provide the first image data to the first device and the second image data to the second device.

In other implementations, a training system may include a communications interface, a processor coupled to the communications interface, and a memory coupled to the processor. The memory may store instructions that cause the processor to generate one or more augmented reality (AR) targets within a training scene. Each AR target of the one or more AR targets may be mapped to a geophysical position within the training scene. The instructions may cause the processor to determine virtual reality (VR) scene data representative of the training scene and including one or more VR targets corresponding to the one or more AR targets, send AR data corresponding to the one or more AR targets to a first device through the network, and send the VR scene data to a second device through the network.

In still other implementations, a system comprises a training system. The training system may include a network interface, a processor coupled to the network interface, and a memory coupled to the processor. The memory may store instructions that, when executed, may cause the processor to generate one or more augmented reality (AR) targets within a training scene. Each AR target of the one or more AR targets may be mapped to a geophysical position within the training scene. The instructions may cause the processor to determine virtual reality (VR) scene data representative of the training scene and including one or more VR targets corresponding to the one or more AR targets, provide AR data related to the one or more AR targets to an AR headset through the network, and a virtual reality (VR) headset communicatively coupled to the training system through the network to receive the VR scene data.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Figure 1:
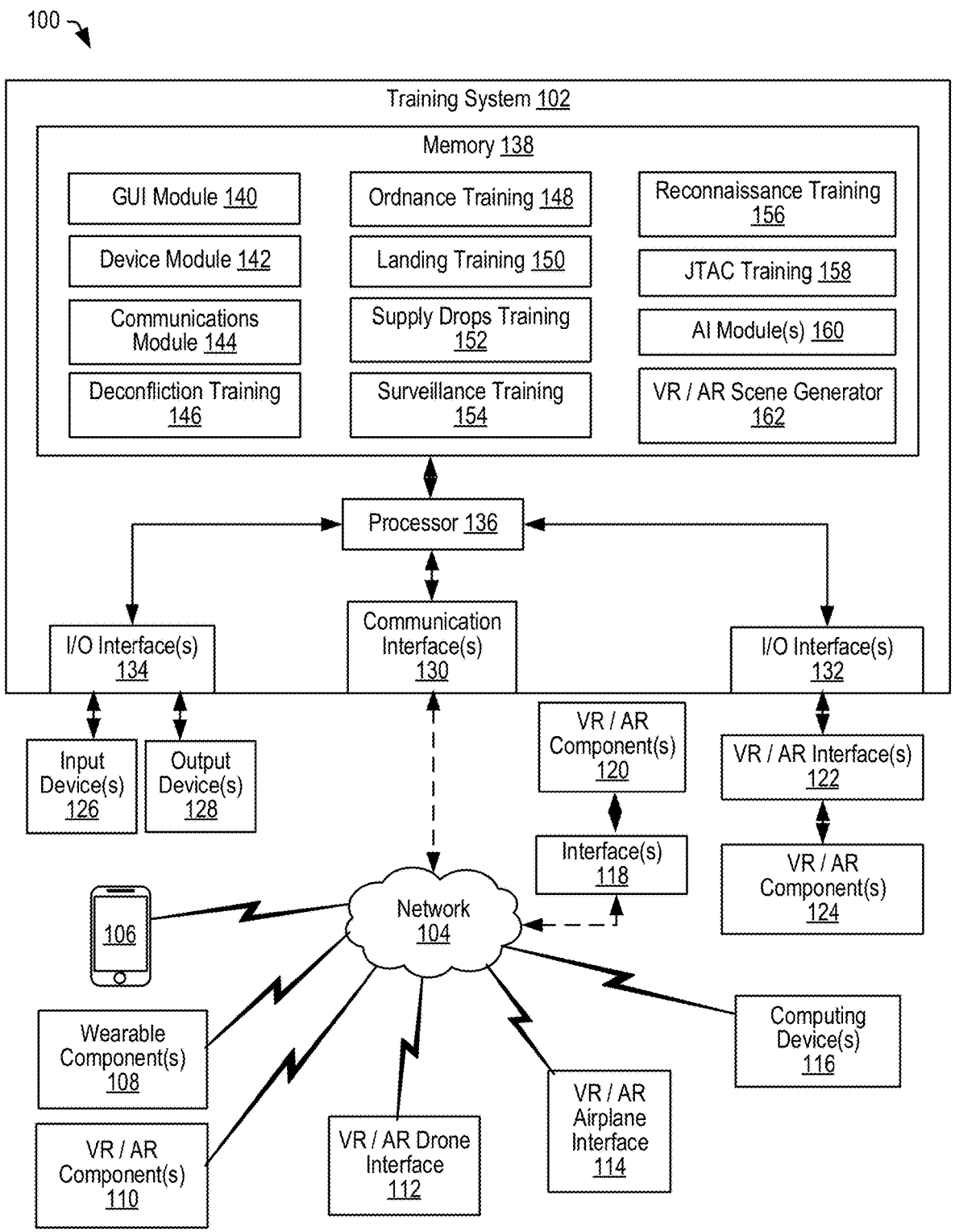
FIG. 1 depicts a block diagram of a training system, in accordance with certain embodiments of the present disclosure.

Embodiments of systems, devices, and methods are described below that can be configured to provide training with respect to fundamental principles and guidance to plan, coordinate, and execute close air support and other offensive air operations for a Joint Terminal Attack Controller (JTAC) or Forward Air Controller (FAC). JTAC and FAC are terms used to refer to a qualified service member who directs action of combat aircraft engaged in close air support (such as air strikes by fixed-winged aircraft, rotary-winged aircraft, and the like) against hostile targets that are engaged with or in close proximity to friendly forces, requiring detailed integration of each air mission with movement of the forces and attacks with aerial bombs, glide bombs, missiles, rockets, aircraft cannons, machine guns, and even directed-energy weapons (such as lasers, microwaves, sounds, and so on). The systems, devices, and methods may also provide training for a user to coordinate other air operations from a forward position, such as airspace deconfliction between multiple aircraft, releasing ordnance, landing procedures, supply drops, surveillance, reconnaissance, other operations, or any combination thereof.

In some implementations, the system may include virtual reality (VR) components (wearable, portable, stationary, or any combination thereof). The VR components may be configured to provide JTAC training by displaying a VR scene on at least one of a VR headset and display and by receiving and responding to user inputs corresponding to user interactions with the VR components. The system can include one or more computing devices in addition to or integrated with the VR components, and optionally a display. The VR components may be standalone or may be coupled to a computing device via a wired or wireless connection.

In some implementations, the system may include augmented reality (AR) components (wearable, portable, stationary, or any combination thereof). The AR components (and the VR components) may be realistic in terms of form-factor and weight, and the system may cooperate with one or more of the components to provide information to the user within the VR or AR scene. In an example, the system may superimpose AR images of one or more of an enemy combatant, an aerial device, an ordnance, a ground vehicle, a structure, or other elements onto a view area of a headset. In an example, the headset may include orientation and attitude sensors as well as global positioning satellite (GPS) circuitry to determine the position of the headset relative to the viewing area as well as the orientation and attitude of the headset. The headset, in response to signals, may superimpose the images onto topography within the viewing area, presenting a realistic scene. The headset may update the orientation and position of the images as the user moves and may present different view as the user turns his or her head.

In some implementations, a cover may be provided for the viewing lens of a spotting scope or for each viewing lens of a pair of binoculars. Each cover may include an optically detectable indicator, such as a quick response (QR) code, a bar code, light-emitting diodes, another indicator, or any combination thereof or may include circuitry to communicate with the training system. The circuitry may include one or more sensors to determine and provide data indicative of the orientation, the attitude, and the position of the device. In an AR implementation, one or more sensors of the headset may determine the optically detectable indicator and, in response to determining of the indicator, may display augmented image data superimposed over the optically detectable indicator within the viewing lens. In some instances, the optically detectable indicator may provide information that may be used by the system to indicate a type of device and other information that can be used to determine one or more combatants or objects for presentation within the viewing lens.

In some implementations, the JTAC training system may be configured to operate in a single-user mode or a multi-user mode, depending on the training exercise. In a single-user mode, the JTAC training system may be configured to provide VR scenes, AR scenes, or both, and to present scenarios that may cause the user to make decisions, enabling training exercises designed to prepare the user for JTAC operations. In a multi-user mode, the JTAC training system may present one or more of VR scenes or AR scenes to each user, which scenes may represent different perspectives of the same scene and which scenes may differ depending on the equipment worn by the particular user (VR headset, AR headset, etc.). Further, in the multi-user mode, the JTAC training system 102 may update the AR data, the VR scene data, or both based on decisions made by each user, in real time, to adjust the scenes for each user, so that the various users may interact in within the training arena to perform a particular forward operation.

In some implementations, the JTAC training system may present a scripted scenario, with associated training tools to guide a user through the scenario as a JTAC. In some embodiments, the training system may begin with a scripted starting point and one or more of the artificial intelligence (AI) modules may control movements and decision-making of one or more of the enemy combatants or elements within the scene. Thus, the user may be confronted with evolving scenarios to which the user can respond by interacting with the VR components. Additionally, each time the user accesses the training scenario, the activity on the ground within the scene may vary based on decisions determined by the AI modules. The user may interact with the scene using one or more devices, and the user's responses may be evaluated, scored, or otherwise reviewed by the user or by a trainer to provide guidance and information to the user. Other embodiments are also possible. An example of a system configured to provide a VR training systems and methods is described below with respect to FIG. 1.

FIG. 1 depicts a block diagram of a training system 100, in accordance with certain embodiments of the present disclosure. The training system 100 may include a training system 102 configured to train JTAC and other actors within a combat scenario. The training system 102 may be configured to communicate with one or more other devices through a network 104, such as a local area network, which may include wired and wireless communications links. The devices may include a smartphone or tablet 106, wearable components 108 (augmented reality (AR), virtual reality (VR), or both), other VR/AR components 110, a VR/AR drone interface 112, a VR/AR airplane interface 114, one or more computing devices 116, one or more other VR interfaces 118, which may couple one or more VR/AR components 120 to the network 104. The training system 102 may also be coupled to one or more VR/AR components 124 through VR/AR interfaces 122.

In an example, the smartphone 106 may include a military application that can provide data related to the battlefield (in the real world) including, for example, maps, route planning, sniper calculations, weather, elevation data, watching live aircraft sensors feed, sending aircraft data from the phone through a special radio, and so on. The training system 102 may be configured to retrieve information that has been uploaded to the military application and may integrate the retrieved information into the scene via one or more of the smartphone 106, wearable components 108, VR/AR components 110, VR/AR drone interface 112, VR/AR airplane interface 114, computing devices 116, or the VR/AR components 120.

In some implementations, the training system 102 may include one or more computer servers configured to communicate data to various devices through the network 104. The training system 102 may be coupled to one or more input devices 126, such as a keyboard, a pen-based device, video cameras, microphones, other input devices, or any combination thereof. The training system 102 may also be coupled to one or more output devices 128, such as displays, speakers, printers, other output devices, or any combination thereof.

The training system 102 may include one or more communication interfaces 130 that may communicatively couple the training system 102 to the network 104. The one or more communication interfaces 130 may include wireless transceivers, Ethernet ports, other network transceivers, or any combination thereof. The training system 102 may include a processor 136 coupled to the one or more network interfaces 130. The training system 102 may include one or more input/output (I/O) interfaces 132 coupled to the processor 136. The I/O interfaces 132 may be coupled to the one or more VR/AR interfaces 122. The I/O interfaces 132 may include one or more electrical connectors (such as a Universal Serial Bus (USB), audio connectors, other connectors, or any combination thereof), one or more transceivers, other communication circuitry, or any combination thereof.

The training system 102 may include I/O interfaces 134 coupled to the processor 136. The I/O interfaces 134 may be coupled to one or more input devices 126 (such as a keyboard, a pointer device, a microphone, other input devices, or any combination thereof) and one or more output devices 128 (such as displays, display glasses, other optical devices, or any combination thereof). In some implementations, one or more of the input devices 126 and the output devices 128 may be combined, such as in a touchscreen display. The I/O interfaces 134 may include one or more electrical connectors (such as a Universal Serial Bus (USB), other connectors, or any combination thereof), one or more transceivers (such as a Bluetooth® transceiver), other communication circuitry, or any combination thereof.

The training system 102 may further include a memory 138 coupled to the processor 136. The memory 138 may be configured to store data and instructions that, when executed, cause the processor 136 to interactively and progressively provide JTAC and other forward operations training experiences and to provide guidance via the various devices and interfaces.

In some implementations, the memory 138 can include a GUI module 140 that, when executed, may cause the processor 136 to generate graphical displays, including one or more VR scenes and various perspectives, which may be provided to one or more output devices 128, including display devices, wearable components 108 (such as a headset), VR/AR components 110, AR/VR drone interface 112, VR/AR airplane interface 114, computing devices 116, other VR components, or any combination thereof. The memory 138 can also include a device module 142 that, when executed, may cause the processor 136 to determine the position, orientation, and movement of a VR/AR component based on sensor data received from the VR/AR component. The device module 142 may provide the determined data to the GUI module 140, which may be configured to utilize the data to generate a VR/AR representation of the VR/AR component within the scene.

The memory 138 may include a communications module 144 that, when executed, may cause the processor 136 to communicate with the various devices 106, 108, 110, 112, 114, 116, 118, 120, 122, and 124. In a particular example, the communications module 140 may cause the processor 136 to communicate with a military application executing on the smart phone 106, which may include maps, route planning information, sniper calculations, weather, elevation data, aircraft sensor feeds, communication data (such as transmission of aircraft data from the smart phone 106 through a special radio), other data, or any combination thereof. The communication module 144, when executed, may cause the processor 136 to pull information that has been uploaded to the military application from the smart phone 106 and integrate it into the training environment. Other embodiments are also possible.

The memory 138 may also include a de-confliction training module 146 that, when executed, may cause the processor 136 to provide situational information, guidance, and VR/AR visual data representing situations relating to training of de-confliction (reducing the risk of collision between aircraft, airborne weaponry, and other devices) in the scene. The de-confliction training module 146 may interact with the GUI module 140 to cause the processor 136 to present a graphical interface including one or more VR/AR scenes and by allowing the operator to interact with the graphical interface through one or more of the VR/AR devices to train in coordination of movements of the aircraft, airborne weaponry, and other devices.

The memory 138 can include an ordnance training module 148 that, when executed, may cause the processor 136 to provide a graphical interface including a scene with which a user may interact to train and learn about ordnance. The memory 138 may include a landing training module 150 that, when executed, may provide a graphical interface including a scene that can be presented to a user for forward position training to assist with landing of an aircraft. The memory 138 may also include a supply drops training module 152 that, when executed, may cause the processor 136 to provide a scene that can be presented within a graphical interface that can be provided to a user for forward position training to assist in supply drops training.

The memory 138 may include a surveillance training module 154 that, when executed, may cause the processor 136 to provide a scene within a graphical interface to provide a training environment for a user to learn about and practice surveillance. The memory 138 can include a reconnaissance training module 156 that, when executed, may cause the processor 136 to provide a scene within a graphical interface to provide a training environment for a user to learn about and practice reconnaissance.

The memory 138 may also include a JTAC training module 158 that, when executed, may cause the processor 136 to provide overall forward position training for a user. The JTAC training module 158 may cooperate with the other modules to provide JTAC training. In an example, the JTAC training module 158 may cause the processor 136 to generate one or more AR elements (such as one or more of an enemy combatant, an aerial device, an ordnance, a ground vehicle, or a structure) and to map the AR elements to geophysical positions within the terrain of a view area of an AR headset. The JTAC training module 158 may also generate VR scene data corresponding to the terrain of the view area and may position VR elements (such as the one or more of the enemy combatant, the aerial device, the ordnance, the ground vehicle, or the structure) within the VR scene data so that both an AR user and a VR user may experience a corresponding view of the training scene from their unique perspectives. Thus, the AR headset of the AR user may receive AR data corresponding to a first perspective, and the VR headset of the VR user may receive VR scene data corresponding to a second perspective.

In some embodiments, the memory 138 can include one or more artificial intelligence (AI) engines or modules 160 that, when executed, may cause the processor 136 to cause combatants within the scene to operate independently. Further, the AI engines or modules 160 may cause the processor 136 to introduce randomness in the scenario and in the operations to create unpredictable situations to which the trainee may be forced to react in order to enhance the user's training experience. The randomness may also alter the scenario from one session to the next, so that the user is confronted with changing scenes and changing scenarios.

The memory 138 may include a VR/AR scene generator 162 that, when executed, may receive position, orientation, and attitude data from each of a plurality of components 108,

110, 112, 114, 120, and 124, and the training system 102 may utilize the received data to determine VR scene data or AR scene data for each component and each user. The scene data may vary according to perspective and device. For example, a first user at a first location at (a first geophysical position) relative to a scene may utilize smart glasses and one or more components to interact relative to a scene including one or more AR objects (e.g., combatants, vehicles, structures, etc.) superimposed over a landscape. A second user at a second location and at a virtual position relative may utilize a VR headset and one or more VR components to interact relative to the scene. The first user and the second user may communicate with one another using radio equipment to coordinate their respective responses.

While the memory 138 is depicted with multiple modules, each with different functionality, in some implementations, the modules may be integrated into a single application. In other embodiments, some of the modules may be combined and some may be maintained as separate modules. The modules may include processor-executable instructions, which may be replaced or modified by an authorized user, either by downloading or receiving the modules through the network 104 or via inputs received from the input device 126. Other implementations are also possible.

In some embodiments, the wearable component 108 can include a VR headset or smart glasses that can be a standalone unit that is not tethered to a laptop or computer tower. In other embodiments, the wearable component 120 or 124 may include a more powerful VR headset can be used and can be tethered to a device, such as the one or more interfaces 118 or the one or more VR/AR interfaces 122. Alternatively, the headset may be coupled to the training system 102 by a wireless communications link and that may receive information from the JTAC training system 102.

In other implementations, an AR device user can interact with the training system 102 using one or more components 108, 110, 112, and 114. Additionally, a user may interact with the training system 102 through one or more of the input devices 126 and one or more of the output devices 128. In still another embodiment, the user may utilize wearable components 108 including a headset, gloves, a backpack, and other components, and the headset may be coupled to a computing device within the backpack to allow the user to move freely.

The training system 102 can be used in a single player mode allowing a single user to interact with the training system 102 to provide JTAC training to the user. Additionally, in some examples, the training system 102 can be used in a multi-user mode, which may allow for student/teacher interactions or which may allow for multiple users communicatively coupled through the network 104, through the secure communications network, or any combination thereof.

In some implementations, the training system 102 may determine terrain and elevation information and dynamically generate VR replicas (VR scenes) within which a user may train. The training system 102 can generate VR scenes in daytime conditions and nighttime conditions and can present suitable equipment to provide the VR user with a nighttime experience. The training system 102 may provide digital night vision goggles, thermal goggles, white phosphorous goggles, or other low-light optical devices with which the user may interact within the VR scene.

In some implementations, the training system 102 may present data to AR devices or components, such as components 108, 110, 112, 114, 120, and 124. The AR devices or components may present one or more AR objects superimposed on real terrain or within a real structure. For example, a first user may wear smart glasses (wearable component 108) in a training arena, such as a desert setting, to simulate a battlefield. One or more targets or enemy combatants may be superimposed onto the terrain within the passthrough view provided by the smart glasses. A second user may wear a VR headset, which may present a VR scene corresponding to the training arena.

In some embodiments, in addition to day time and night time visualizations, the training system 102 may be configured to replicate a wide range of weather effects including rain, wind, fog, snow, fallen leaves, heat waves, cloud cover at adjustable altitudes, mud, sleet, hail, other weather conditions, or any combination thereof. In some embodiments, the training system 102 may also be configured to replicate forward position training, including smoke, enemy combatants, and so on. Further, the training system 102 can set the sun in the realistic position within the VR scene based on coordinates of real world locations, and can set the moon according to the lunar calendar and change the illumination based on the realistic positions of the sun and/or the moon, and based on the weather conditions. In some instances (and in response to user input), the training system 102 can fast forward time to speed up the time of day and various world atmospherics including aircraft flight.

In AR implementations, the training system 102 may superimpose one or more combatants, vehicles, or other elements onto a real-world terrain. The training system 102 may determine shading and other aspects of the scene and may present the various elements within the scene with appropriate shading.

In some embodiments, the training system 102 may be configured to interact with multiple users, substantially simultaneously. In some embodiments, an administrator or trainer may interact with the training system 102 via a computing device, such as a laptop, to control of what aircraft are in the scene, what altitude they are flying at, what ordnance they drop, where the ordnance is dropped, where to place their sensor, where to land if the aircraft is a helicopter, and so on. Further, the administrator or trainer can use the computing device to determine distances on the map, place enemies in locations, move enemies to new locations after placement, remove or delete enemies, change direction of travel of enemies, create any possible combination of groupings of enemy combatants and equipment. In an example, the administrator can interact with the computing device to control the VR scenario provided by the training system 102, combining combatant controls, personnel controls, and equipment controls, such as the position and distribution of trucks, tanks, boats, helicopters, planes, motorcycles, cars, armor, rockets, missiles, and so on. Further, the administrator may utilize the computing device to place friendlies (and optionally non-combatants) in locations, move friendlies to new locations after placement, remove or delete friendlies, change direction of travel of friendlies, and so on.

It should be appreciated that the training system 102 may be configured to receive data from multiple devices and to provide scene data to each of the devices, so that each device can uniquely and appropriately represent the same scene from whatever angle the user is viewing from within the scene. Other embodiments are also possible.

In some implementations, the training system 102 may be configured to present one or more objects within a scene. The training system 102 may determine a geophysical position of each of the one or more objects within the scene. Additionally, the training system 102 may determine optical data for superimposition within the viewing area of smart glasses based on their orientation and attitude relative to the scene, optical data for rendering a VR version of the scene for one or more VR users, and so on. The optical data may be presented accurately for each device and for each user. Additionally, actions taken by one user that may affect the scene may be accurately represented within the optical data presented to the other users.

In an example, aerial support may drop live ordnance on an object within an AR scene, and the impact of the ordnance may be represented to an AR user on the ground. A JTAC user training in forward operations may be able to view the scene through smart glasses, seeing the aerial support, the live ordnance, and the impact of the ordnance on the object superimposed within the scene.

Figure 2:
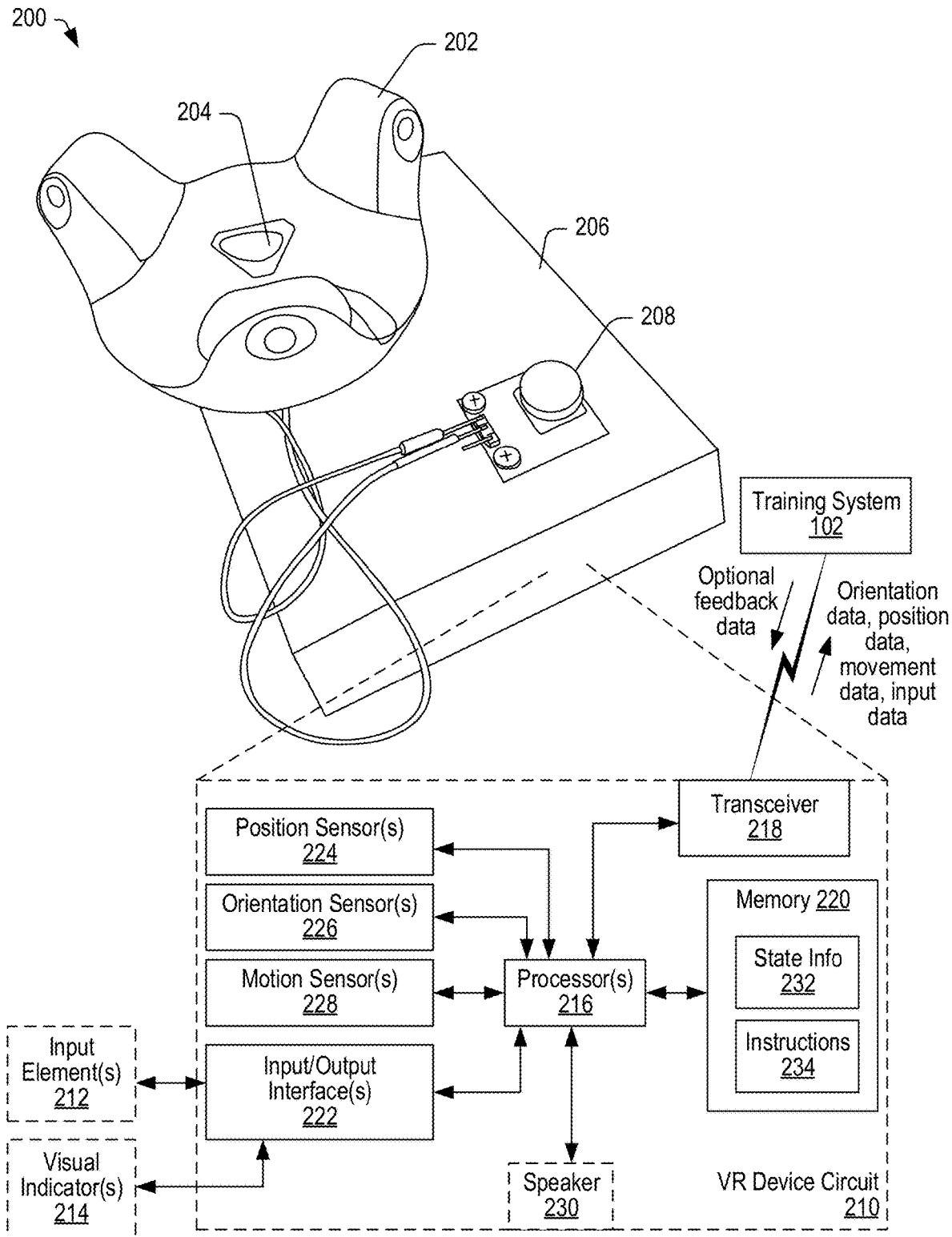
FIG. 2 depicts an embodiment of a VR or AR component that can be used in connection with the training system of FIG. 1, in accordance with certain embodiments of the present disclosure.

FIG. 2 depicts an embodiment of a VR component 200 that can be used in connection with the VR training system 100 of FIG. 1, in accordance with certain embodiments of the present disclosure. The VR component 200 may be an example of the VR components 112. In this example, the VR component 200 may include a device 202 with an indicator 204, which may be coupled by wires to a base unit 206. The base unit 206 may include a button 208 that can be actuated by the user and that can be representative of a device that includes a button in the VR scene. Other VR devices of various shapes and sizes may also be represented.

The base unit 206 can include a VR sensor that can allow anything to which it is attached to be tracked in the VR scene when the user puts the VR headset on. Any signal input connected to the sensor can be transmitted to the computer and show output in the VR scene. It should be appreciated that this component represents one possible example of how an item can be tracked. For example, the button 208 may be placed on a 3D printed box, such that when the button 208 is pressed, a signal is sent to the training system 102 to update the VR scene. The button 208 on the physical device may simulate a button presented within the VR scene.

In the illustrated example, the device 202, the base unit 206, or both can include a circuit 210, which may include a printed circuit board, an integrated circuit, any combination thereof. The circuit 210 may be coupled to one or more input elements 212, one of which may include or may be mechanically coupled to the button 208, for example. The circuit 210 may also be coupled to one or more visual indicators 214, such as a light-emitting diode (LED), a display screen, or another circuit element, any of which may be represented within the VR scene.

The circuit 210 may include a processor 216 and a transceiver 218 coupled to the processor 216. The transceiver 218 may be configured to communicate with the training system 102. The circuit 210 may also include a memory 220 coupled to the processor 216. The memory 220 may be configured to store data, such as state information 232, and instructions 234 that, when executed, may cause the processor 216 to perform various operations. The state information 232 may represent orientation, attitude, and other data associated with the device 202.

The instructions 234 may vary based on the type of device. For example, a button press device (such as the base 206 with the button 208) may provide a switch or button that the user may select, and the instructions 234 may cause the processor 216 to generate an audio signal for output via the speaker 230 in response to the button press. In another example, the device may include a spotting scope, and the instructions 234 may present different functionality via the processor 216 in such an embodiment. Other examples and other corresponding instructions are also possible.

The circuit 210 can also include one or more input/output interfaces 222 coupled to the processor 216 and configured to couple to the input elements 212 and to the one or more visual indicators 214. Further, the circuit 210 may include one or more position sensors 224, which may include a global positioning satellite (GPS) circuit or other location determination circuit that can determine a location of the device 202 or the base unit 206 relative to the user. The circuit 210 may further include one or more orientation sensors 226 that may provide orientation data representing an orientation of the device 202 or the base unit 206 relative to the user's position and relative to the ground. In the context of a simulation firearm or an optical device, the orientation data from the orientation sensors 226 may also represent the orientation of the device relative to a field of view of the device. The circuit 210 may also include one or more motion sensors 228 that may provide signals to the processor 216 that are proportional to the direction and magnitude of the movement of the device 202 or the base unit 206. In some embodiments, the circuit 210 may further include or may be coupled to a speaker 230, which may be coupled to the processor 216 and which may be configured to emit audible sounds. Other embodiments are also possible.

In some embodiments, both the device 202 and the base unit 206 may include an embodiment of the circuit 210. Further, the circuits 210 of the device 202 and the base unit 206 may communicate with one another, with the training system 102, or any combination thereof. Other embodiments are also possible.

Figure 3:
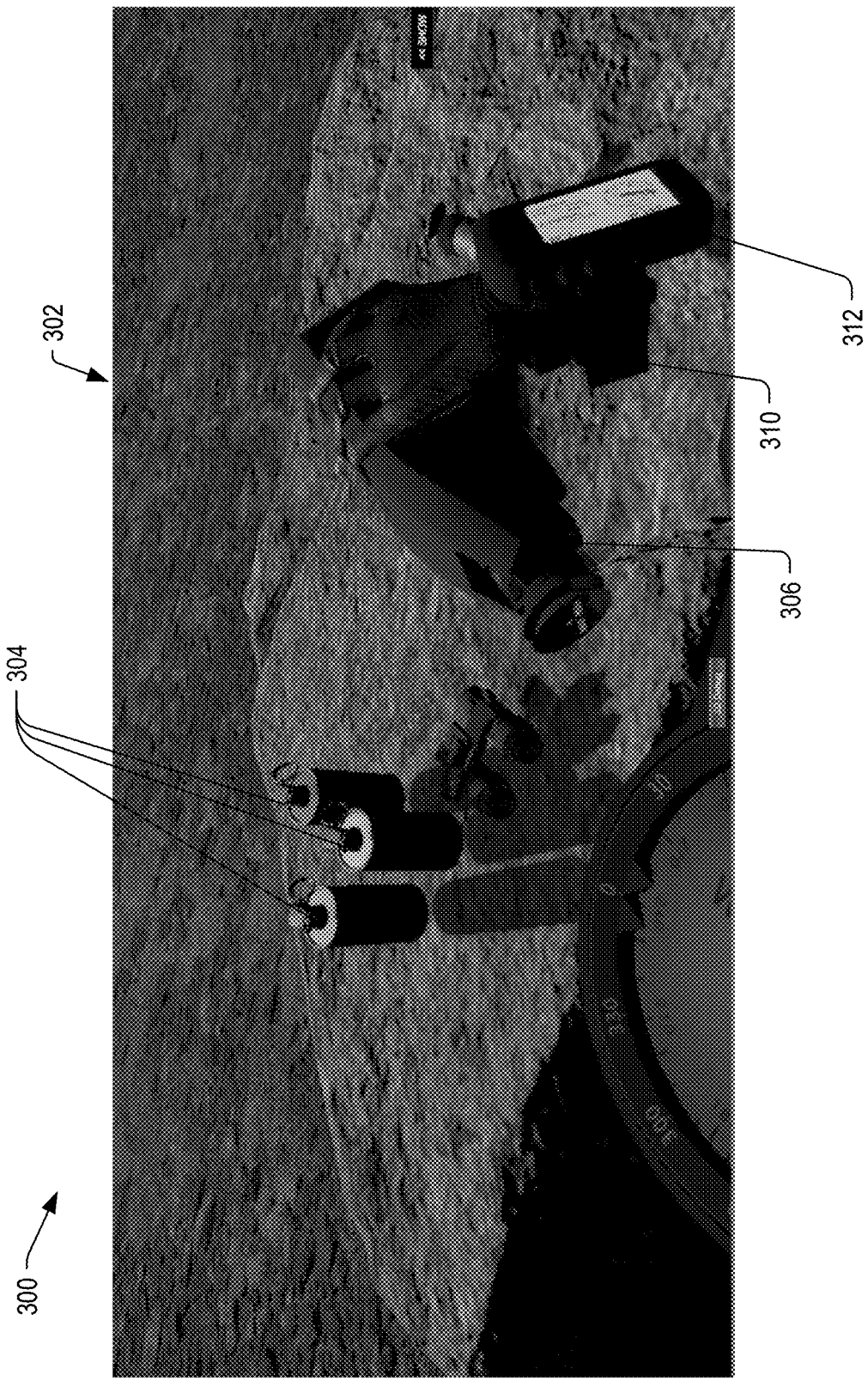
FIG. 3 depicts a display of a headset showing wearable components and other components within a VR or AR environment, in accordance with certain embodiments of the present disclosure.

FIG. 3 depicts a display 300 of a VR headset showing wearable VR components and other VR components within a VR environment, in accordance with certain embodiments of the present disclosure. In the illustrated example, the display 300 includes a VR scene 302 presented on a digital display within the VR component 108 (e.g., a VR headset). The VR scene 302 includes structures as well as items that can be handled or otherwise operated by the VR user, including wearable elements 106 such as a glove 310 and a wrist-worn electronic device 312. Further, the VR scene 302 includes smoke bombs 304, spotting scope or rangefinder 306, which can be handled by the VR user within the VR environment. In this example, the VR user has picked up the range finder 308, and the user's glove 310 and wrist-worn electronic device 312 are shown in the foreground.

The training system 102 may cooperate with the VR components to update the VR scene and the information presented by the wrist-worn electronic device 312 or visible through the rangefinder 306 based on the direction that the user is facing within the VR scene 302. Further, over time, weather, time of day, and other situational information may cause visuals within the VR scene 302 to evolve. Other embodiments are also possible.

In the illustrated example, the rangefinder 306 is in the foreground of the VR scene 302. As the user interacts with the rangefinder 306, position sensors, motion sensors, orientation sensors, and so on within the component may communicate sensor data to the training system 102, and the VR representation of the object within the VR scene may be changed to reflect the sensor data. Other embodiments are also possible.

Figure 4:
FIG. 4 depicts portions of the training system of FIG. 1 including a display, a computing device, and a headset, in accordance with certain embodiments of the present disclosure.

FIG. 4 depicts portions 400 of the training system 100 of FIG. 1 including a display, a computing device, and a VR headset, in accordance with certain embodiments of the present disclosure. In this example, the portions 400 may include a display device 402 presenting an aerial view 408 of a VR scene. The portions 400 may further include a laptop computing device 404 coupled to the display device 402 and optionally to a video camera 406, which is partially visible near the edge of the display device 402. Further, the portions may include a VR headset 410, which is currently resting on the surface of table. Other VR components and other computing devices may also be included.

Figure 5:
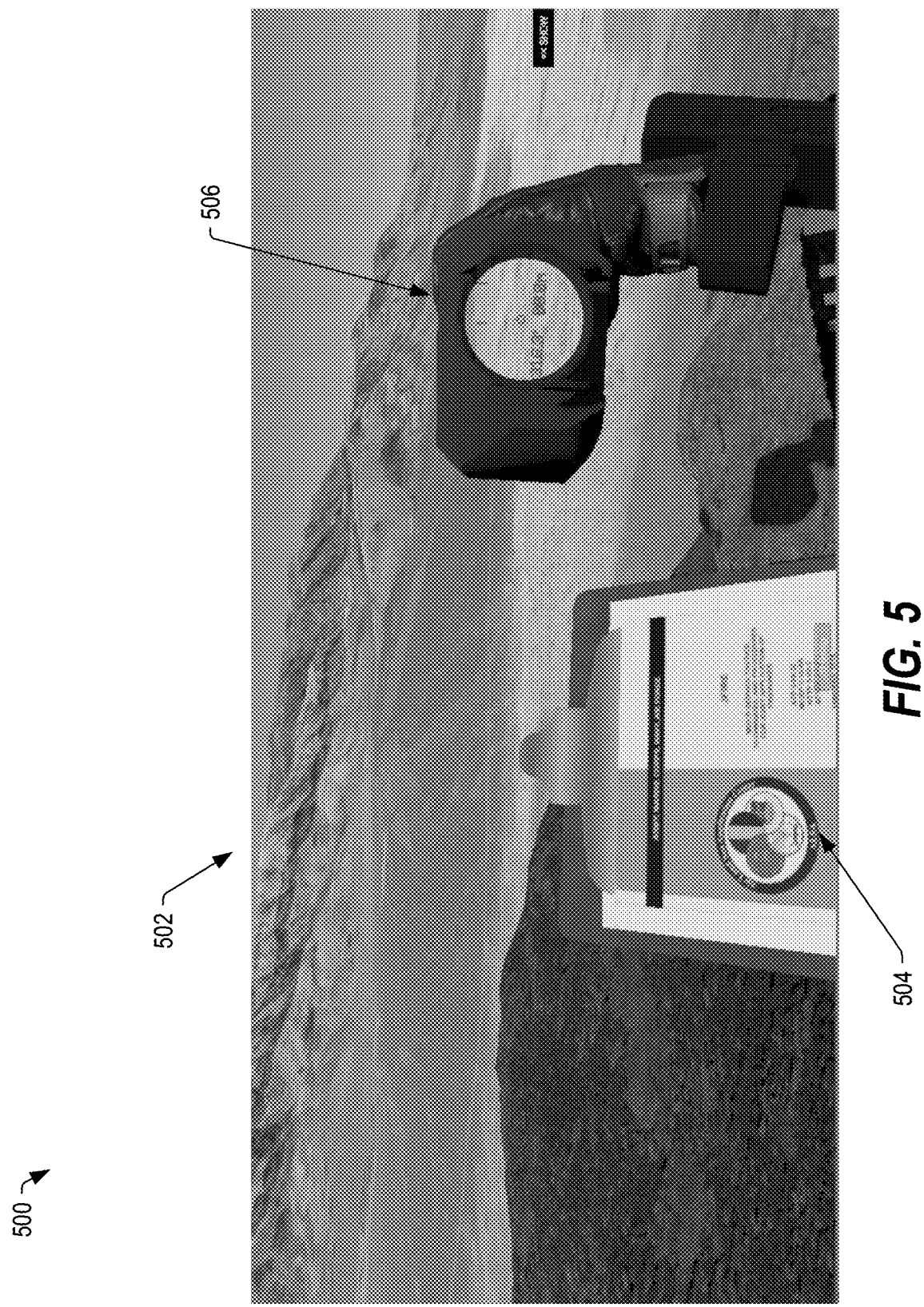
FIG. 5 depicts a graphical display of a day view that can be presented on a display of a headset or on a display of a computing device showing a JTAC view of a forward operator, in accordance with certain embodiments of the present disclosure.

FIG. 5 depicts a graphical display 500 of a day view that can be presented on a display of a VR headset or on a display of a computing device showing a JTAC view of a forward operator, in accordance with certain embodiments of the present disclosure. In this example, the display 500 depicts a VR scene 502 in daylight conditions and looking through a lens of an optical device. Further, the VR scene 502 includes a tablet or notebook 504 with data. In some embodiments, if the user interacts with the notebook 504 by turning a page, the information presented on the notebook 504 may change. Other implementations are also possible.

The VR scene 502 may include an optical device 506, such as a rangefinder or other device. In this example, a portion of the view area is depicted within an optical window of the device 506. In this example, the optical device 506 may be a VR device. In an alternative example, the optical device 506 may be a real-world optical device with a cover over its optical display. The cover may include a circuit or visual indicator that can be detected by the VR headset and that can communicate a type of device as well as location, orientation, and attitude data to the headset or the training system 102. The cover may enable the use of the same device in both VR and AR environments, since the same data may be used to facilitate presentation of the device in a VR environment and AR environment. In response to such data, the headset may receive optical data representing the position of the user and the perspective of the device and/or the user.

Figure 6:
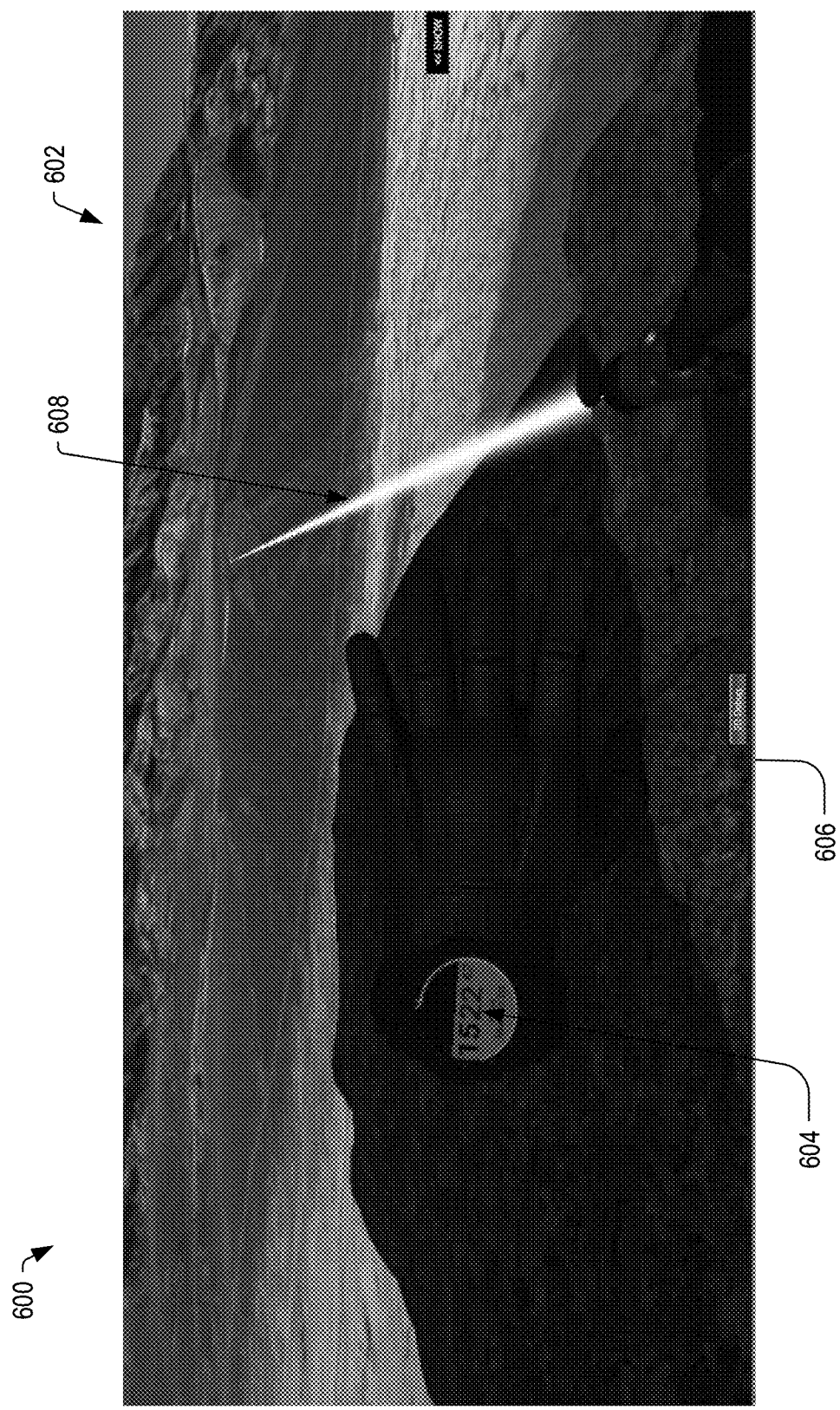
FIG. 6 depicts a graphical display of a night vision view that can be presented on a display of a headset or on a display of a computing device showing a JTAC view of a forward operator, in accordance with certain embodiments of the present disclosure.

FIG. 6 depicts a graphical display 600 of a night vision view that can be presented on a display of a VR headset or on a display of a computing device showing a JTAC view of a forward operator, in accordance with certain embodiments of the present disclosure. Alternatively, the night vision view may be presented as augmented image data on viewing lenses of a pair of smart glasses. In this example, the display 600 depicts a VR scene 602 in night or low light conditions and looking through a lens of an optical device. Further, the VR scene 602 includes a VR wrist-worn element 604 and a VR glove 606 in the foreground. Additionally, the scene 602 further includes a beam 608, which may represent a rangefinder beam or a beam to illuminate a target for aerial bombardment. The user may move his or her arm, changing the position and orientation of the wrist-worn element 604 and the VR glove 606. Additionally, the user may reposition the beam 608, which changes may be reflected in the scene 602. Other embodiments are also possible.

Figure 7:
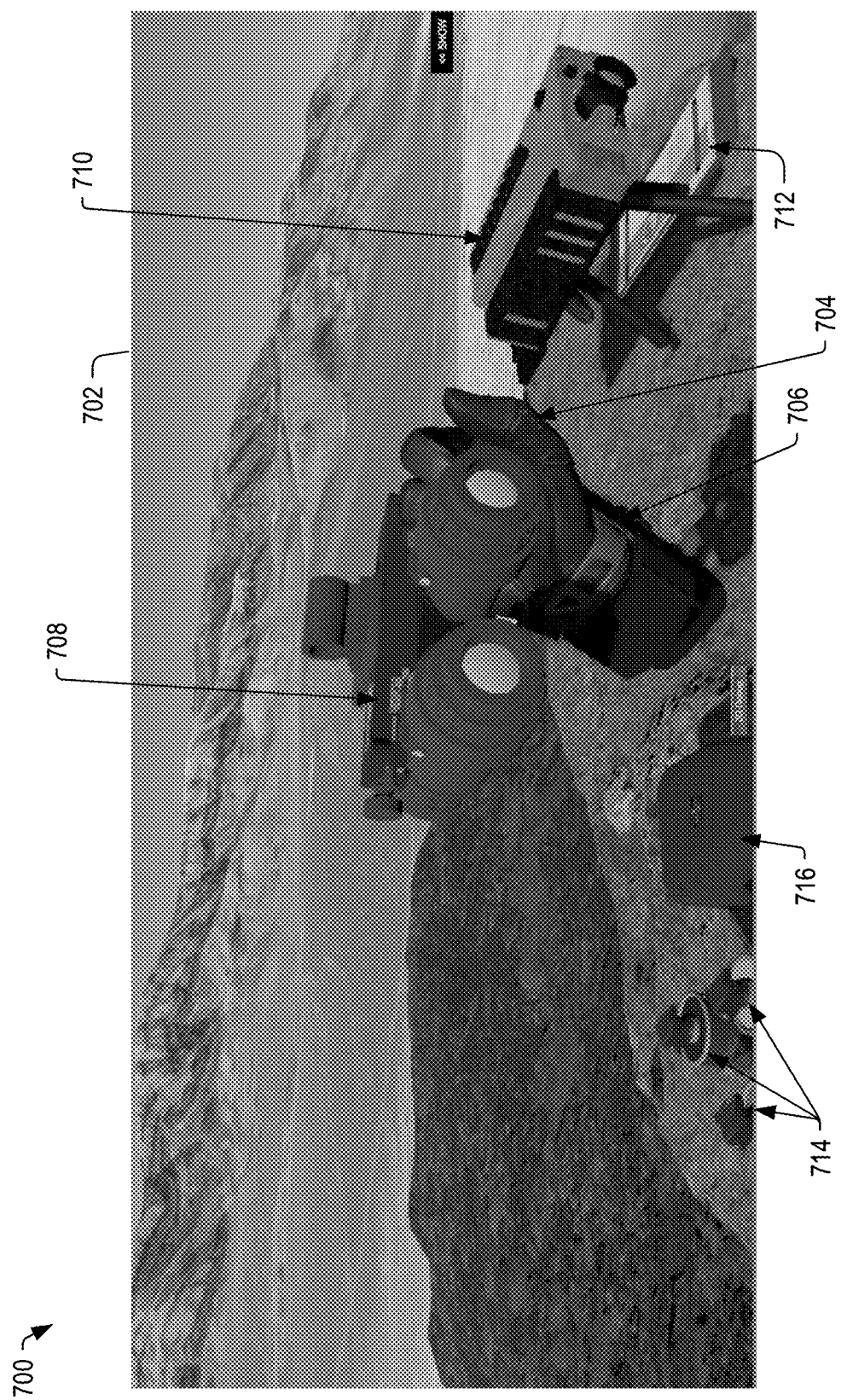
FIG. 7 depicts a graphical display of a day view that can be presented on a display of a headset or on a display of a computing device showing a JTAC view of a forward operator, in accordance with certain embodiments of the present disclosure.

FIG. 7 depicts a graphical display 700 of a day view that can be presented on a display of a VR headset or on a display of a computing device showing a JTAC view of a forward operator, in accordance with certain embodiments of the present disclosure. In this example, the graphical display 700 may depict a VR scene 702, which may be presented on a display of a computing device. The graphical display 702 may include a glove 704, a wrist worn wearable element 706, binoculars 708, spotting scope 710, notes 712, smoke grenades 714, other items 716, and so on. Other options are also possible.

Within the graphical interface 702, the scene is presented in the background, and the user's VR glove 704 and a pair of binoculars 708 are presented in the foreground. The user may move causing the VR scene 714 to update the position of the VR glove 716 and the binoculars 718. Other VR components and other devices may also be presented.

In some embodiments, in response to user selection of one of the options 708, 710, and 712, the VR scene 714 may be updated accordingly. Further, in some embodiments, background features, such as vehicles, combatants, and the like, may move, and the VR scene 714 may be updated accordingly.

Figure 8:
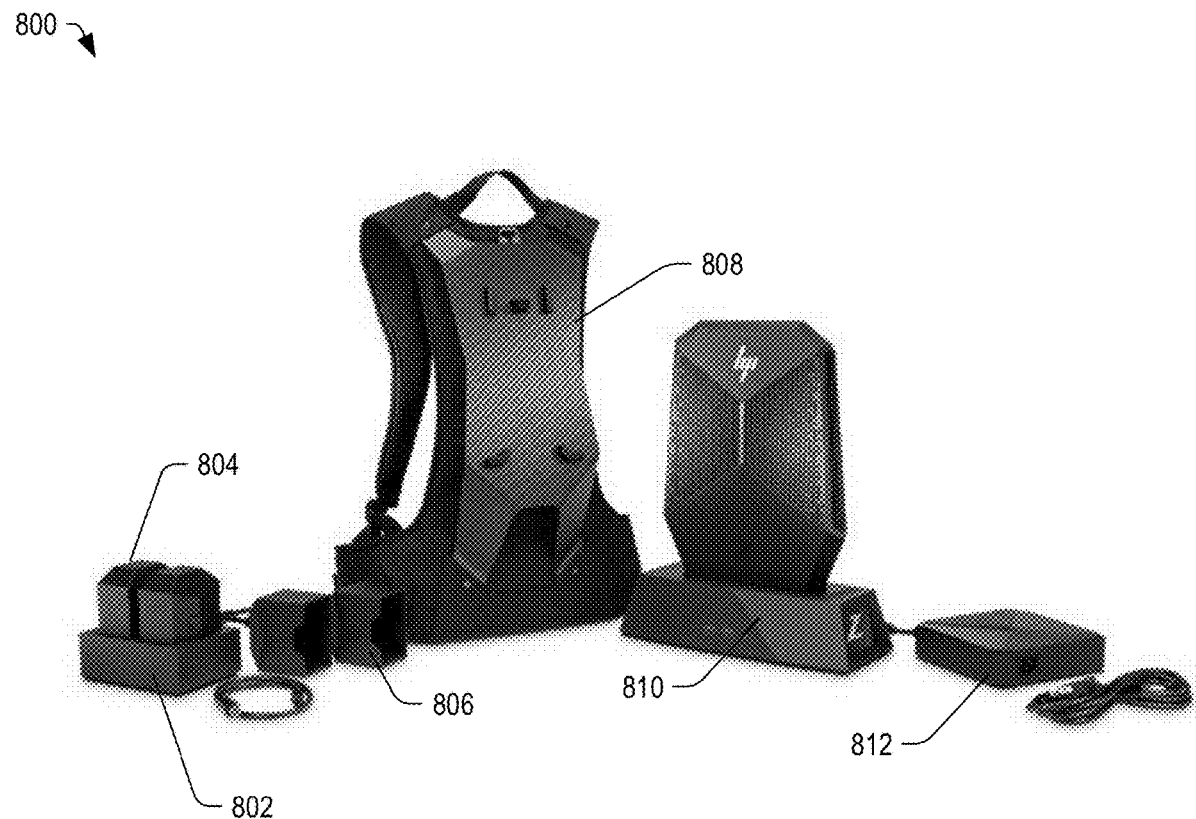
FIG. 8 depicts a plurality of components that can be used with the training system of FIG. 1, in accordance with certain embodiments of the present disclosure.

FIG. 8 depicts a plurality of components 800 that can be used with the training system 102 of FIG. 1, in accordance with certain embodiments of the present disclosure. In this example, the components 800 can include a battery charger 802 and rechargeable batteries 804. The components 800 can include battery ports 806 that can engage batteries 804 to supply power to a backpack 808, which can be worn by a user and which can include ports for hot-swappable, rechargeable batteries. In some implementation, a VR headset or an AR headset can be coupled to a computing device secured by the backpack 808 via a wired or wireless communications link.

The components 800 may further include a wearable VR personal computing device, generally indicated at 810, which may include a docking base including a plurality of communication ports, such as Universal Serial Bus (USB) ports, a High-Definition Multimedia Interface (HDMI), a mini display port (mini-DP), an audio combo jack, a power port, and other connection ports. The components 800 can also include a power adapter 812, which may be configured to engage the battery charger 802, the docking base, other components, or any combination thereof.

The illustrated example of the components 800 represent some, but not all, possible example components that can be used as part of the training system 102 of FIG. 1. Other components and other devices are also possible.

Figure 9:
FIG. 9 depicts a VR headset that can be used with the training system of FIG. 1, in accordance with certain embodiments of the present disclosure.

FIG. 9 depicts a VR headset 900 that can be used with the VR training system 102 of FIG. 1, in accordance with certain embodiments of the present disclosure. The VR headset 900 may include a display 902 (and optionally other processing circuitry) and a strap 904 configured to mechanically couple the headset 900 to a user's head. In some embodiments, the strap 904 may also include electrical leads to couple the display 902 and other circuitry. In some embodiments, a wireless transceiver may be mounted to the strap 904. The VR headset 900 may also include earphones 906 and, in this example, a cable 908 to electrically couple the VR headset 900 to a computing device, such as the computing device 810 of FIG. 8. Other embodiments are also possible.

It should be appreciated that the VR headset 900 represents one possible example of a wearable component 108 that can be used with the training system 102 of FIG. 1. Other VR headsets and other VR components may also be used.

It should be appreciated that the training system 102 in FIG. 1 and the various displays and VR components described above with respect to FIGS. 1-9 may be utilized in conjunction with a training program for JTAC personnel. In some embodiments, the training system 102 may utilize aerial photographs of a region to assemble a digital representation of the view area that can be presented in a VR scene or to which objects may be mapped in both VR and AR scenes.

Figure 10:
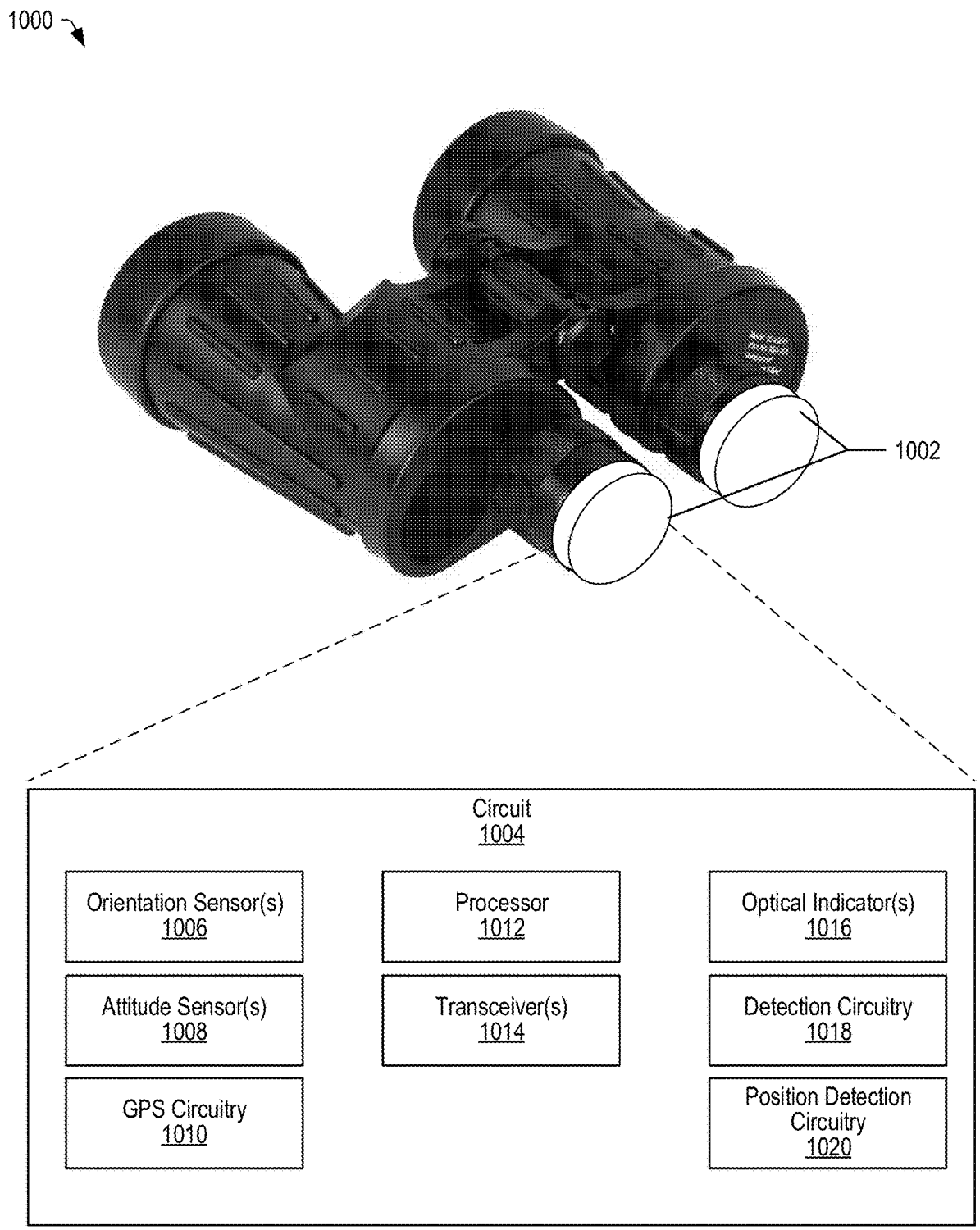
FIG. 10 depicts an example of a device including an adapter to communicate data related to the device to the training system, in accordance with certain embodiments of the present disclosure.

FIG. 10 depicts an example of a device 1000 including an adapter 1002 configured to communicate data related to the device 1000 to the training system 102, in accordance with certain embodiments of the present disclosure. In this example, the device 1000 may be an example of a pair of binoculars with a pair of lens covers 1002, which may include circuitry 1004.

The circuit 1004 may include one or more orientation sensors 1006 configured to determine orientation data associated with the device 1002. The circuit 1004 may also include one or more attitude sensors 1008 to determine attitude data associated with the device 1002. The circuit 1004 may include global positioning satellite (GPS) circuitry 1010 to determine a geophysical location of the device 1002.

The circuit 1004 may also include a processor 1012 coupled to the sensors 1006, 1008 and GPS circuitry 1010 and coupled to one or more transceivers 1014 to send data related to signals from the sensors 1006 and 1008 and data related to the GPS location 1010 to one or more other devices. The circuitry 1004 may also include one or more optical indicators 1016 to communicate data to smart glasses, a VR headset, or another computing device. The circuitry 1004 may include detection circuitry 1018 to determine the cover 1002 is coupled to the device 1000 and optionally determine a type of device 1002 (e.g., spotting scope, binoculars, or another device). In some implementations, the circuitry 1004 may also include position detection circuitry 1020 configured to determine proximity of a first cover 1002 relative to a second cover 1002, so that the AR device or VR device can present the correct stereo view.

In some implementations, a user may install a cover 1002 onto a viewing lens of a device. Upon installation, the user may interact with a computing device (such as a smartphone, a headset, or another interface) to configure settings associated with the cover 1002. The cover 1002 may detect the presence of a second cover 1002 and may determine orientation data, attitude data, and proximity data, which data the cover 1002 may communicate to the computing device (or to the training system 102). In response to sending the data, the computing device may present image data at a position corresponding to the cover 1002 such that the user may observe the image data by accessing the component within the scene. Other embodiments are also possible.

Figure 11:
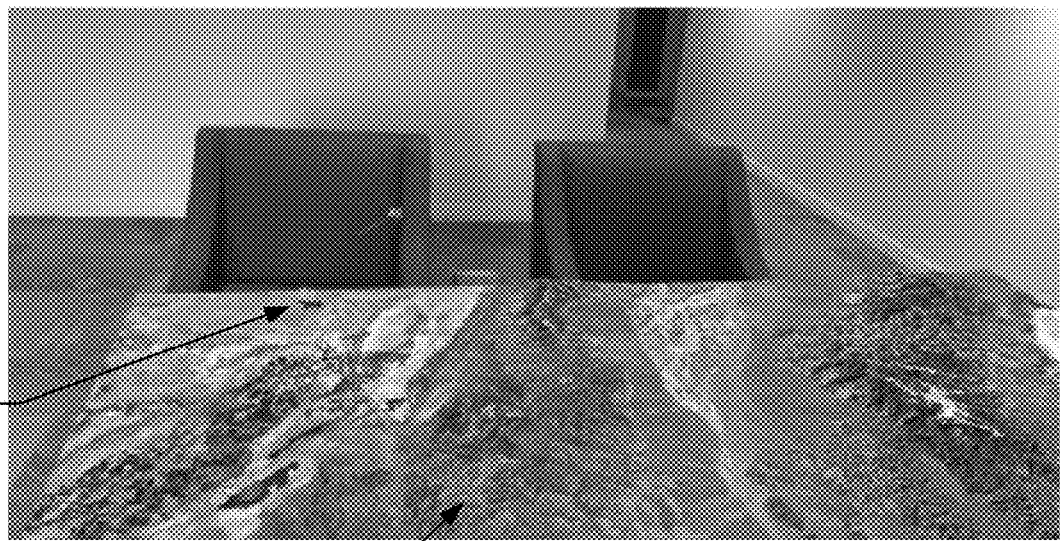
FIG. 11 depicts an example of an AR scene superimposed onto a table and including terrain and aircraft shown flying over the terrain, in accordance with certain embodiments of the present disclosure.

FIG. 11 depicts an example of an AR scene 1100 superimposed onto a table and including terrain 1102 and aircraft 1104 shown flying over the terrain 1102, in accordance with certain embodiments of the present disclosure. Using smart glasses or other components, a user may view an AR scene 1100 or AR elements (1102, 1104, other elements, or any combination thereof) superimposed on real world terrain or surfaces. The AR scene 1100 may be presented in an office setting or in the field, depending on the implementation.

In an example, an officer may observe a training session in his or her office, while other users participate in various capacities. One or more of the aircraft may also exist in the real world and may interact with real or augmented reality elements on the ground. Various users may also interact with the scene in different ways, with different devices, and from different perspectives. The training system 102 may be configured to provide optical data relative to each device and each component according to the geophysical position of the component (or the role of the user) with respect to the training scenario.

Figure 12:
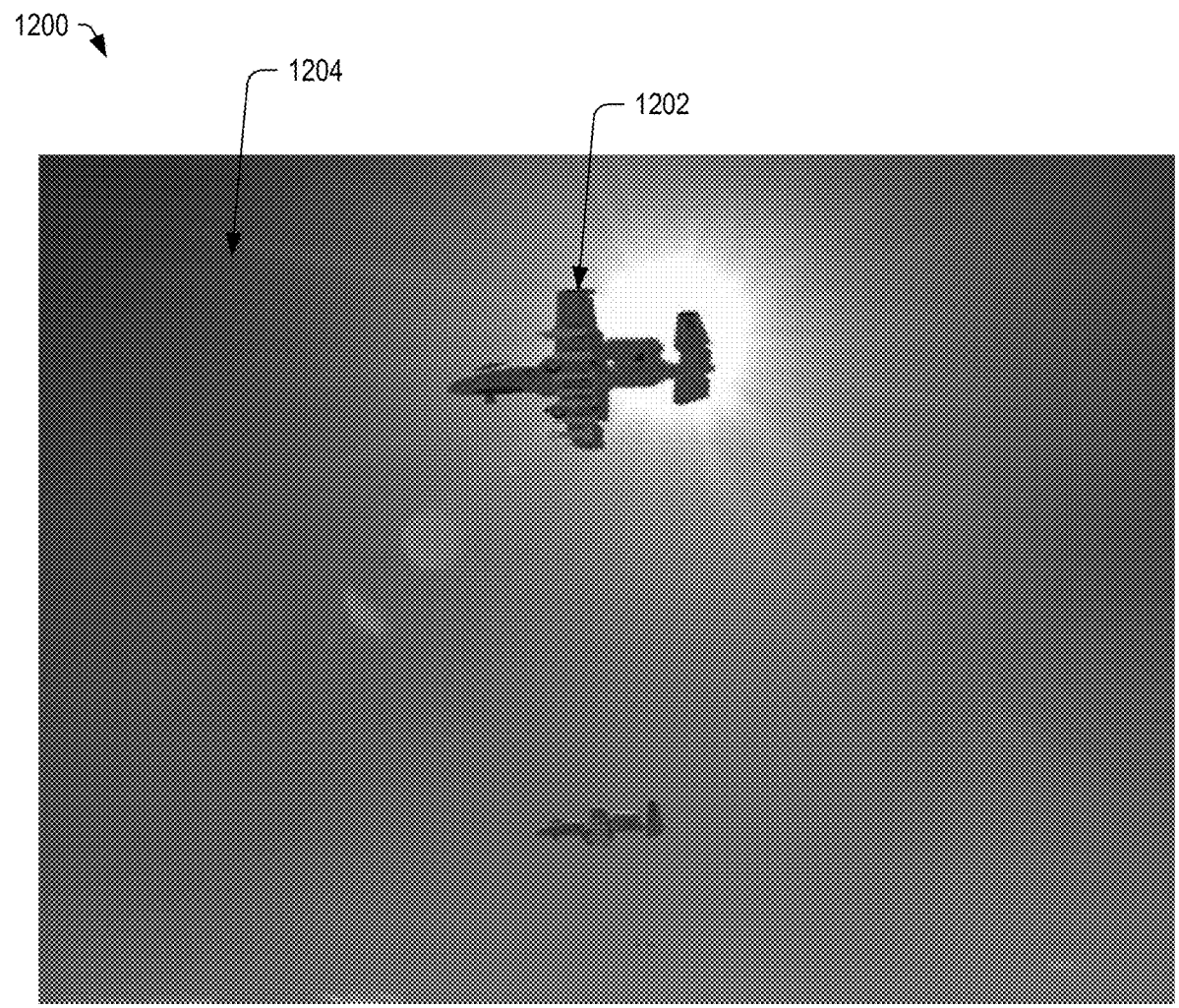
FIG. 12 depicts an example of an AR scene including aircraft superimposed overhead against a clear sky, in accordance with certain embodiments of the present disclosure.

FIG. 12 depicts an example of an AR scene 1200 including aircraft 1202 superimposed overhead against a clear sky 1204, in accordance with certain embodiments of the present disclosure. The AR scene 1200 may include multiple aircraft, including bombers, drones, fighters, helicopters, and so on. Within the AR scene 1200, some or all the aircraft 1202 may be superimposed onto the scene 1200 and real aircraft, if present, may also be visible.

Figure 13:
FIGS. 13-14 depict a user interacting with a ruggedized tablet computing device, in accordance with certain embodiments of the present disclosure.
Figure 14:
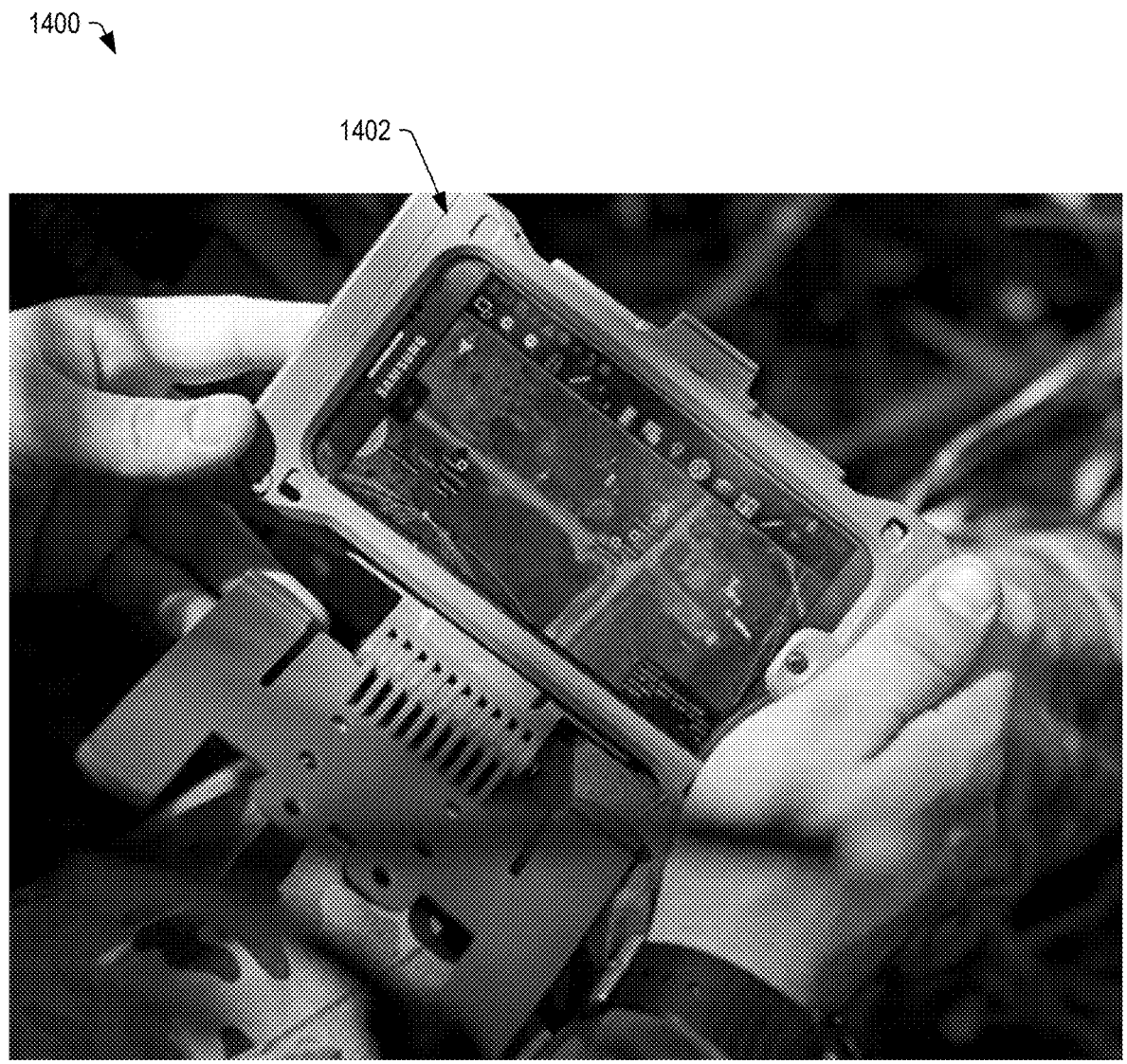

FIGS. 13-14 depict a user interacting with a ruggedized tablet computing device, in accordance with certain embodiments of the present disclosure. FIG. 13 includes a picture 1300 of a user in the field interacting with a touchscreen computing device, which may include a processor coupled to one or more transceivers and a memory coupled to the processor. The memory may store data and a military application that, when executed, may cause the processor to provide map information, instructions, other data, or any combination thereof. In an AR scene, the smart glasses may provide a passthrough visual to another user, such that the second user's view may be that shown in the picture 1300.

In FIG. 14, a picture 1400 is shown that can include a screen view of the tablet computing device 1402, which may include an aerial map or other data associated with a training area or mission. The tablet computing device 1402 may be the ruggedized computing device of FIG. 13. In this example, the screen view may provide information that can be used by the JTAC to perform de-confliction operations, or other control operations. The tablet computing device can be rendered in the VR scene, and the screen data may be real or may be augmented by the AR headset or the VR headset.

Figure 15:
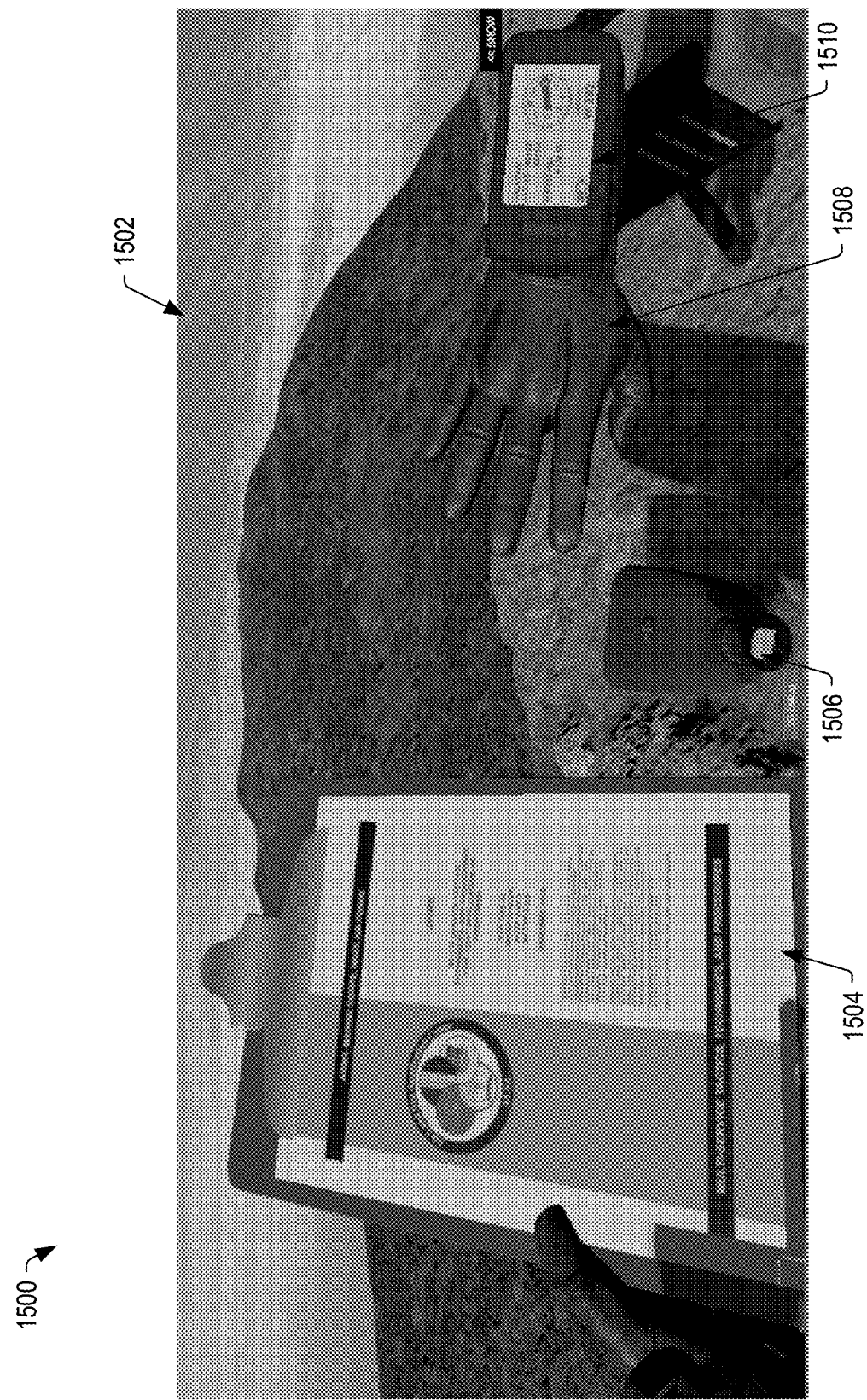
FIG. 15 depicts a VR or AR scene including one or more components accessible by the user, in accordance with certain embodiments of the present disclosure.

FIG. 15 depicts a display 1500 of a VR scene 1502 including the three-dimensional photogrammetry rendering of an area, in accordance with certain embodiments of the present disclosure. In this example, the VR scene 1502 can include the 3D photogrammetry rendering of the area and including a notebook 1504, a rangefinder 1506, the user's glove 1508, and a wrist-worn computing device 1510.

In some examples, the wrist-worn computing device 1510 may include a VR touchscreen interface including display information and user-selectable features that the user can interact with using his or her VR glove 1508 on his or her other hand. Other VR components and other VR elements can be used in connection with this VR scene 1502. Other embodiments are also possible.

In conjunction with the wrist-worn computing device 1510, the computing device 1510 can be a tablet computer, a smartphone device, or another computing device. The computing device 1510 can include a military application that can provide help on the battlefield including maps, route planning, sniper calculations, weather, elevation data, live aircraft sensors feed, and so on. Additionally, the military application may allow the user to send aircraft data from the device through a special radio transceiver to one or more other devices. In this example, the VR scene 1502 can represent such a device, and the VR user may interact with the device within the VR scene 1502 to engage the same functionality as provided within the military application on the user's phone.

In some embodiments, the training system 102 may be configured to communicate with the user's actual smartphone or mobile computing device through Bluetooth® or another short-range wireless communications protocol to provide information that has previously been uploaded to the military application. The training system 102 may also communicate a command to the user's actual smartphone or mobile computing device to pause the military application until the VR simulation is complete. The uploaded data can be integrated into the training system 102, which can then present the military application on the computing device 1510 within the VR scene 1502.

In some embodiments, a wired connection or wireless broadcast signal from the real smartphone of the user may be provided to a laptop or other computing device or to a wireless/wired router that receives the information from the real smartphone and displays the information inside the VR scene 1502.

In some embodiments, the training system 102 can present drones and other aerial devices over the training site of the VR scene 1502 to map the VR generated devices to the 3D models. In some embodiments, like the images of the area used to generate the VR scene, images and/or video of actual drones flying over the area can ported into the training system 102. In an example, the training system 102 can be configured to import or otherwise receive real-world 3D rectification/photogrammetry into the VR software, and the images and/or video can be used to inform or otherwise generate the VR scene.

In an example, the training system 102 may include a 3D model of a training site/hostile enemy area with accurate grid locations, which may have been generated using computer-aided drawings (CAD), images of the area, computer-generated graphics, other data, or any combination thereof. In some embodiments, the smartphone or other tablet computing device may include the military application, and the user may have done some pre-planning for the area on his or her smartphone using the military application. Then, when the user imports the 3D model into the VR scene and imports the information from the smartphone of that same area, the training system 102 may be configured to overlay the information onto the 3D model.

In some embodiments, the components of the training system 102 can be packed into a single mobile unit, such as within a backpack or a hard, protective case with foam inside, reinforced cardboard box, etc. Other embodiments and other methods of transporting the components are also possible.

It should be appreciated that any number of VR devices, AR devices, covers, covers, or components can be provided and/or created in order to provide a realistic training environment and realistic JTAC tools or devices that the JTAC would be expected to utilize during a particular operation. In the following illustrated examples, a variety of example devices are shown, which may be purchased off-the-shelf from existing VR manufactures; which may be 3D printed and manufactured with sensors for use in connection with a training environment; which may have already been created and which may be modified, customized, or otherwise configured to interact with the JTAC training system 102, or any combination thereof.

In other implementations, the real device may be used in connection with a cap or cover configured to provide a visual indicator that can be used by the smart glasses or VR headset to determine the device and to present optical data associated with the device. For example, as the user raises the binoculars to look through the viewing lens, the smart glasses detect a cover on the viewing lens, determine the device, receive orientation and attitude data associated with the device, and determine image data for display at the viewing lens of the device so that the user sees an appropriate view through the viewing lens. As the user changes the orientation of the device, the system may change the optical data presented via the viewing lenses.

Figure 16A:
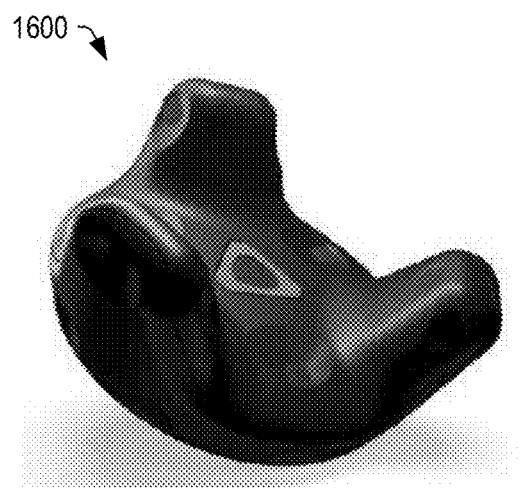
FIGS. 16A-16C represent physical devices that can include circuitry configured to interact with the training system to provide position and orientation information for representation within the VR or AR scene, in accordance with certain embodiments of the present disclosure.
Figure 16B:
Figure 16C:
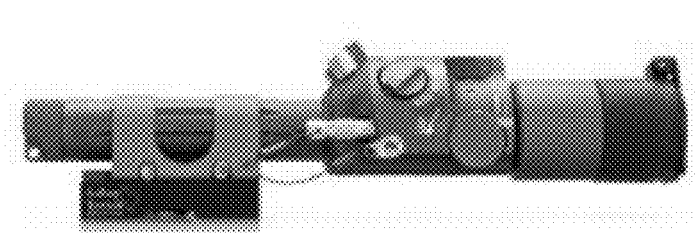

FIGS. 16A-16C represent physical devices that can include circuitry configured to interact with the VR system or a cover to interact with the AR system (or the VR system) to provide position and orientation information for representation within the scene, in accordance with certain embodiments of the present disclosure. In FIG. 16A, for example, an HTC VIVE tracker device 1600 is shown, which may be utilized as one of the VR components configured to interact with the training system 102 in FIG. 1 or as the device 202 configured to interact with the training system 102 in FIG. 2. In an example, the HTC VIVE tracker device 1600 may be configured to bring real-world objects into the VR scene by tracking position, orientation, and other parameters of the real-world objects and using that data to represent the real-world objects within the VR scene.

In FIG. 16B, an example embodiment of an advanced global positioning satellite (GPS) receiver 1610 is shown, which may include a display and user-selectable buttons. In some embodiments, the GPS receiver 1610 may be a VR component that is formed from plastic or other material and configured to simulate the operation of a real GPS receiver within the VR scene and which may include an embodiment of the circuit 210 of FIG. 2.

In FIG. 16C, an example of an IZLID laser pointer device 1620 is shown, which may be fabricated as a VR component and configured to interact with the training system 102. In some embodiments, the housing of the device 1620 may be cast, 3D printed, or otherwise fabricated, and circuitry and associated instructions may be installed within the housing to enable interactivity with the training system 102.

The VR components may include textures, weight distributions, and other features and aspects that may replicate real-world devices in terms of weight, feel, and interactivity. To accomplish such replication, in addition to generation of the housing, weights and other components may be added to enhance the realism for better training effect.

Alternatively, as discussed above, real-world components may be utilized in conjunction with a cover that includes circuitry to determine orientation data, attitude data, and device data and to communicate the data to one or more of a headset and the training system 102. In this alternative example, the real-world look and feel of various components is maintained and the VR or AR headset can use the data from the device to provide image data that is positionally and directionally correct for the device.

Figure 17A:
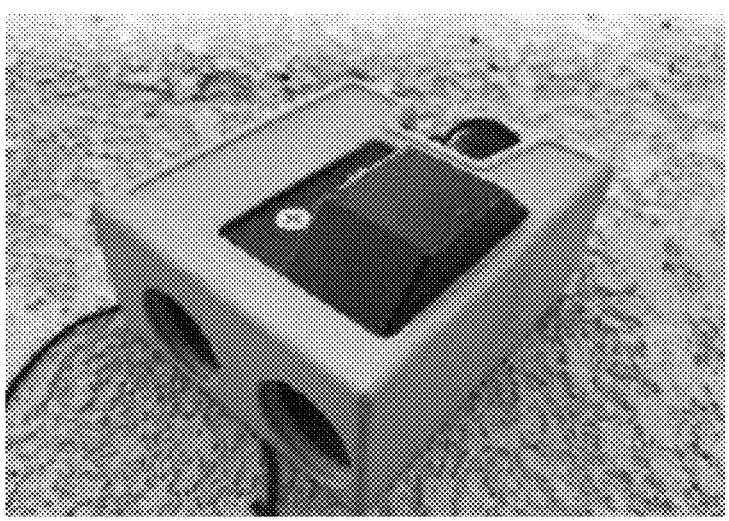
FIGS. 17A-17B represent optical devices that can include circuitry configured to interact with the training system to provide position and orientation information for representation within the VR or AR scene, in accordance with certain embodiments of the present disclosure.
Figure 17B:

FIGS. 17A-17B represent optical devices that can include circuitry configured to interact with a VR component or an AR component to provide position and orientation information for representation within the scene, in accordance with certain embodiments of the present disclosure. In FIG. 17A, one possible example of a VR component 1700 that replicates spotting scope is shown, which may be a replica of a PLRF 15 rangefinder. In FIG. 17B, one possible example of a VR component 1710 that replicates a different commercially available range finder (PLRF 25) is shown. Real-world specifications may allow for ranging measurements up to 6,000 meters as well as accurate angle measurements, which functionality may be replicated within the VR environment.

In some implementations, any commercially available device may be replicated for training purposes within the VR system. By incorporating position, orientation, and motion sensors, the device's position, orientation, and motion can be replicated in the VR scene. Alternatively, a commercially available device may be adapted for use with the training system 102, such as by adding a cover or other element to the existing device, which cover or element includes a circuit to determine orientation data, attitude data, position data, and so on, which data may be communicated to a VR component, an AR component, the training system 102, or any combination thereof.

Figure 18A:
FIGS. 18A-18C represent optical devices that can include circuitry configured to interact with the training system to provide position and orientation information for representation within the VR or AR scene, in accordance with certain embodiments of the present disclosure.
Figure 18B:
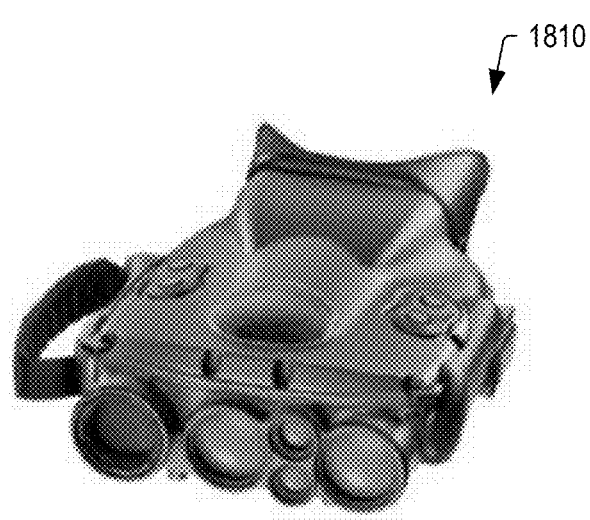
Figure 18C:
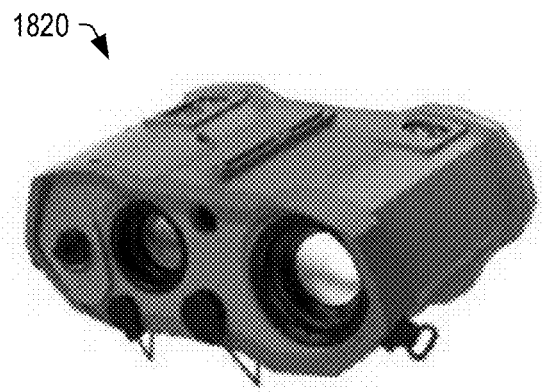

FIGS. 18A-18C represent optical devices that can include circuitry configured to interact with the VR system to provide position and orientation information for representation within the VR scene, in accordance with certain embodiments of the present disclosure. In FIG. 18A, a vector rangefinder 1800 is shown, which can be implemented as a VR component for use with the training system 102. In FIG. 18B, a VR component 1810 is shown that can replicate a JIM LR/HR/Sentinel/projector, which may be a commercially available optical device. In FIG. 18C, a VR component 1820 is shown that can replicate another embodiment of a rangefinder within the VR environment for use with the training system 102. In this example, the VR component 1820 may replicate a commercially available rangefinder, such as the MOSKITO.

In some implementations, the devices of FIGS. 18A-18C may be actual field devices, which may include a cover with circuitry to communicate with one or more of a VR headset, an AR device (e.g., smart glasses), or the training system 102. Thus, commercially available devices may be adapted for use with the training system 102.

Figure 19A:
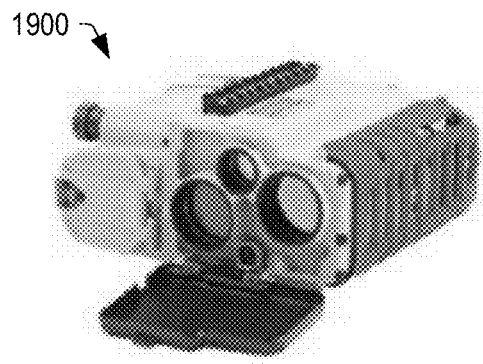
FIGS. 19A-19C represent optical devices that can include circuitry configured to interact with the training system to provide position and orientation information for representation within the VR or AR scene, in accordance with certain embodiments of the present disclosure.
Figure 19B:
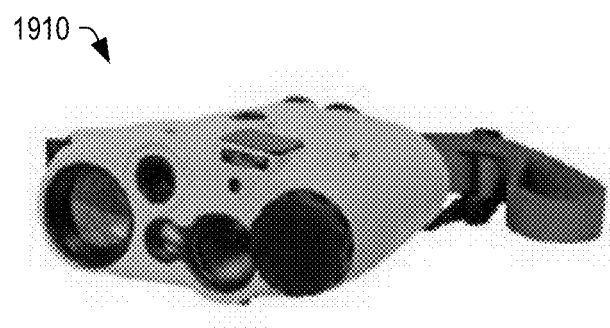
Figure 19C:
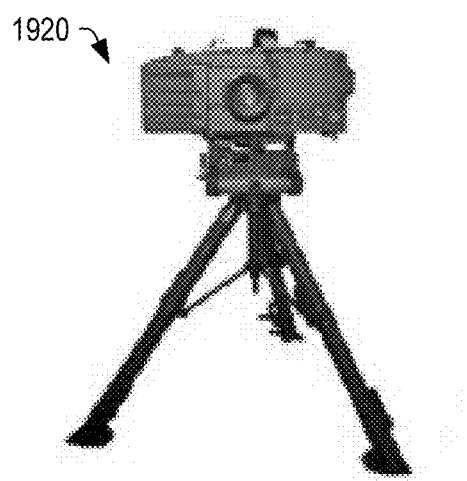

FIGS. 19A-19C represent optical devices that can include circuitry configured to interact with the VR system or a cover with circuitry to interact with the AR system (or the VR system) to provide position and orientation information for representation within the scene, in accordance with certain embodiments of the present disclosure. In FIG. 19A, a component 1900 is shown that may replicate, within the scene, the functionality of an electro-optical sensor, such as the EJTAC-LTD device by Elbit Systems. In FIG. 19B, a VR component 1910 is shown that may replicate, within the VR scene, the functionality of an electro-optics sensor device, such as the CLRF-IC device by Elbit Systems. In FIG. 19C, a VR component 1920 is shown that may replicate, within the VR scene, the functionality of an electro-optics sensor device, such as the AN/PEQ-17 device by Elbit Systems.

In some implementations, the devices of FIGS. 19A-19C may be actual field devices, which may include a cover with circuitry to communicate with one or more of a VR headset, an AR device (e.g., smart glasses), or the training system 102. Thus, commercially available devices may be adapted for use with the training system 102.

Figure 20A:
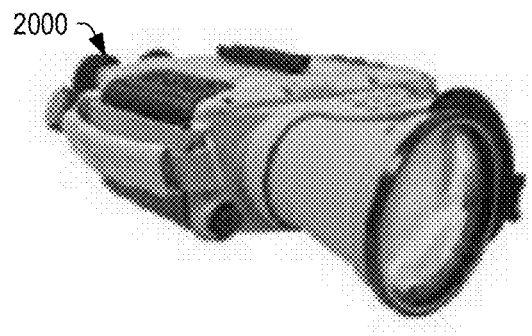
FIGS. 20A-20C represent optical devices that can include circuitry configured to interact with the training system to provide position and orientation information for representation within the VR or AR scene, in accordance with certain embodiments of the present disclosure.
Figure 20B:
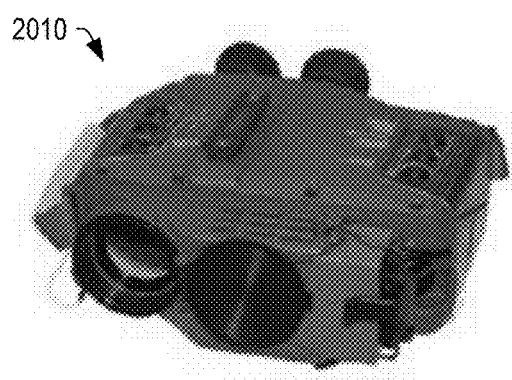
Figure 20C:
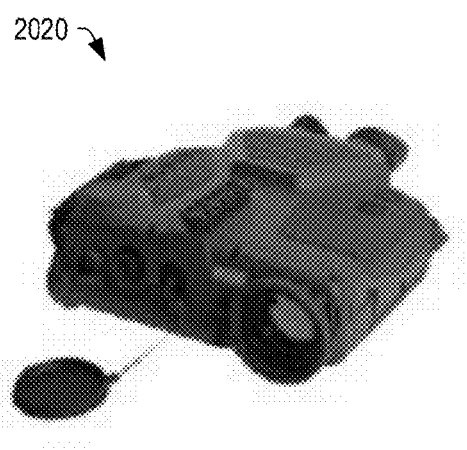

FIGS. 20A-20C represent optical devices that can include circuitry configured to interact with the VR system to provide position and orientation information for representation within the VR scene, in accordance with certain embodiments of the present disclosure. In FIG. 20A, a VR component 2000 is shown that may replicate, within the VR scene, the functionality of an electro-optical sensor, such as the AN/PAS-25 device by Elbit Systems. In FIG. 20B, a VR component 2010 is shown that may replicate, within the VR scene, the functionality of an electro-optics sensor device, such as the AN/PAS-22 LRTI device by Elbit Systems. In FIG. 20C, a VR component 2020 is shown that may replicate, within the VR scene, the functionality of an electro-optics sensor device, such as the EMERALD-RTSA device by Elbit Systems.

In some implementations, the devices of FIGS. 20A-20C may be actual field devices, which may include a cover with circuitry to communicate with one or more of a VR headset, an AR device (e.g., smart glasses), or the training system 102. Thus, commercially available devices may be adapted for use with the training system 102.

Within a VR scene, multiple users may interact through a single training system 102. Some of the users may operate different aspects within the VR training scenario (e.g., JTAC, pilot, sniper, spotter, and so on). In an example, the user may interact with other users within the VR scene. In some instances, the user may turn his or her head to view another user represented in the VR scene and may see the objects being handled by the user. One possible example is described below with respect to FIG. 21.

Figure 21:
FIG. 21 represents a user within a VR or AR scene interacting with one of the devices of FIGS. 16C-20C, in accordance with certain embodiments of the present disclosure.

FIG. 21 represents a VR scene 2100 within which a user within a VR scene interacting with one of the devices of FIGS. 16C-20C, in accordance with certain embodiments of the present disclosure. In this example, the user of the training system 102 may turn his or her head and view another VR user (or a simulated user controlled by the AI engine), which may help to provide a realistic JTAC scenario. Other embodiments are also possible.

In some implementations, the device depicted in FIG. 21 may be an actual field device, which may include a cover with circuitry to communicate with one or more of a VR headset, an AR device (e.g., smart glasses), or the training system 102. Thus, commercially available devices may be adapted for use with the training system 102.

Figure 22:
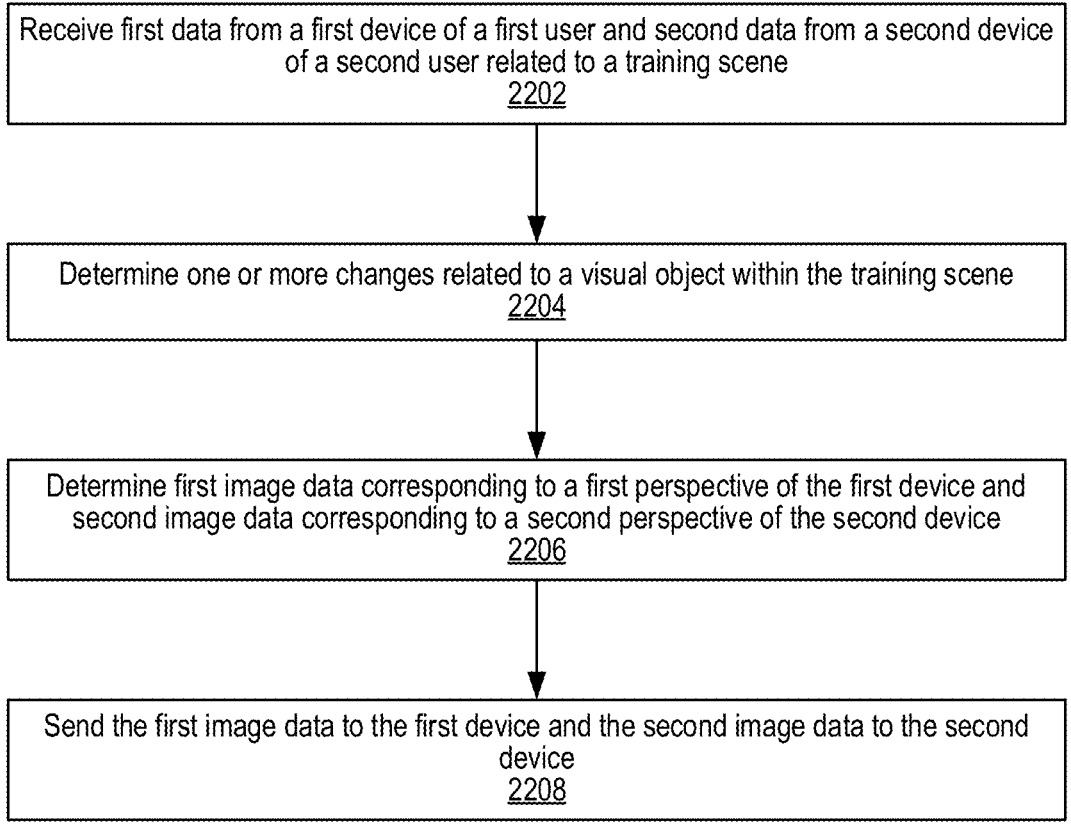
FIG. 22 depicts a flow diagram of a method of providing a training scenario, in accordance with certain embodiments of the present disclosure.

FIG. 22 depicts a flow diagram of a method 2200 providing a training scenario, in accordance with certain embodiments of the present disclosure. At 2202, the method 2200 may include receiving first data from a first device of a first user and second data from a second device of a second user, where the first data and the second data are related to a training scene. The first data may include position data, orientation data, attitude data, device data, other data, or any combination thereof that is associated with the first device. The second data may include position data, orientation data, attitude data, device data, other data, or any combination thereof that is associated with the second device.

At 2204, the method 2200 may include determining one or more changes related to a visual object within the training scene. In an example, a vehicle may move within the scene. The geophysical position of the vehicle may be need to be calculated relative to one or more of a feature of the terrain, the first device, or the second device. As the vehicle moves, the geophysical position changes, and one or more of the component and the training system 102 may determine the changes relative to the respective view of the respective device. In an example, the first device may be a VR device that presents a VR scene, and the second device may be an AR device that presents a scene with the superimposed image of the vehicle. The movement of the vehicle should be consistent for both the first device and the second device, and the training system 102 coordinates the appearance and position of the vehicle across multiple devices and perspectives. Additionally, views presented through the viewing lenses of binoculars or other optical devices or the display of a computing device may also be updated.

At 2206, the method 2200 may include determining first image data corresponding to a first perspective of the of the first device and second image data corresponding to a second perspective of the second device. In this example, one or more of the components (VR or AR) or the training system 102 may determine the image data for the perspective. For example, a JTAC user may have a different view of the scene than a spotter for a sniper positioned at a different location, and the different in their respective views of the scene are varied accordingly.

At 2208, the method 2200 may include sending the first image data to the first device and the second image data to the second device. In an example, the training system 102 may send the image data to the correct device.

Figure 23:
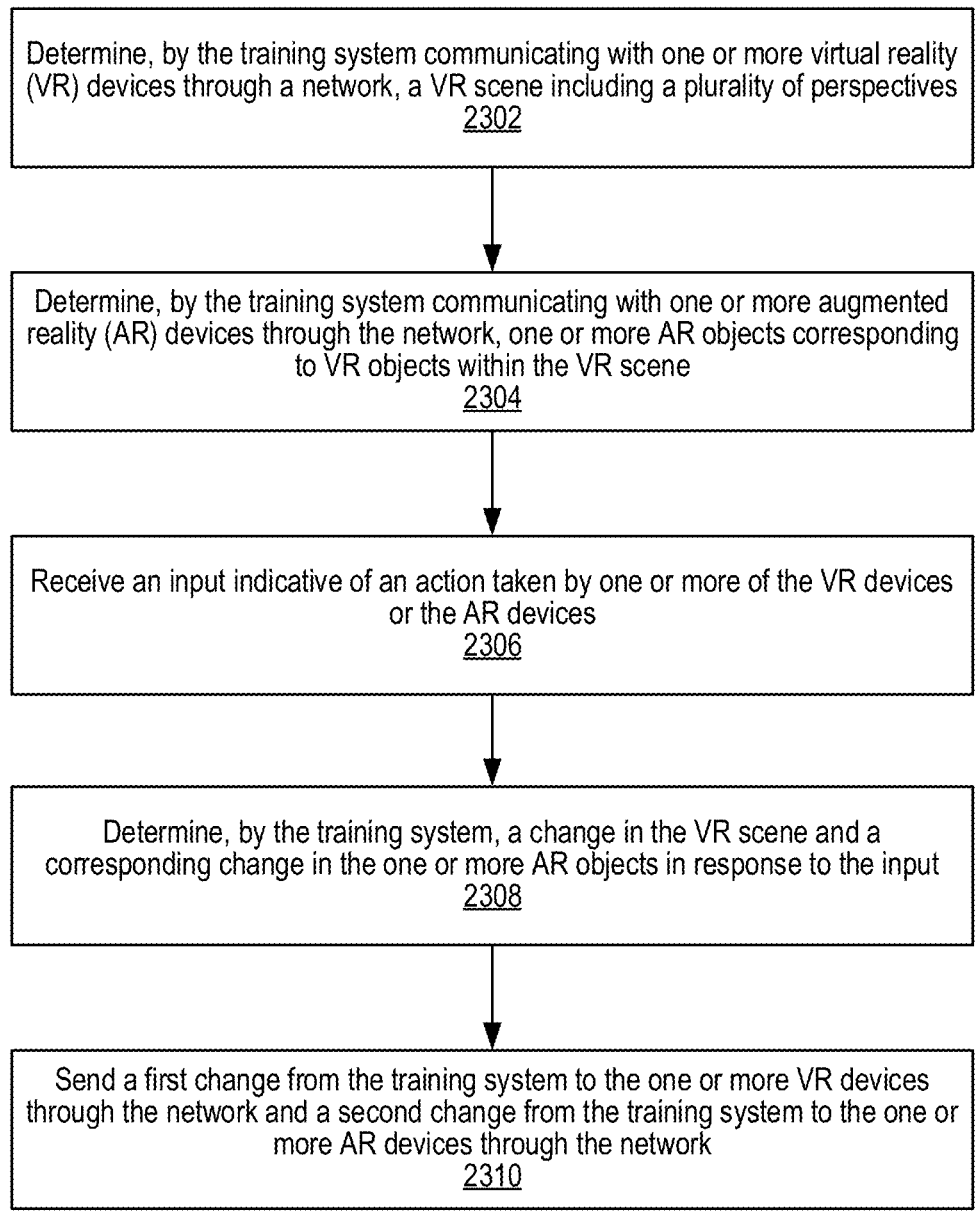
FIG. 23 depicts a flow diagram of another method of providing a training scenario, in accordance with certain embodiments of the present disclosure.

FIG. 23 depicts a flow diagram of a method 2300 providing a training scenario, in accordance with certain embodiments of the present disclosure. At 2302, the method 2300 may include determining, by the training system communicating with one or more VR devices through a network (which may include the Internet, local area networks, other networks, or any combination thereof), a VR scene including a plurality of perspectives. Each perspective may be unique to one of the VR devices.

At 2304, the method 2300 may include determining, by the training system communicating with one or more AR devices through the network, one or more AR objects corresponding to VR objects within the VR scene. In an example, the terrain within the VR scene may be a digital representation of the terrain in a view area of the AR device, and some of the VR objects (such as enemy combatants, vehicles, and so on) may be replicated as AR objects so that the user of the AR device may view a scene that is substantially the same as that presented to the user of the VR device (though their perspectives may be different, based on different positions relative to the scene).

At 2306, the method 2300 may include receiving an input indicative of an action taken by one or more of the VR devices or the AR devices. For example, a user of the VR device may operate a firearm or apply a laser marking on a target within the scene. The input may be indicative of the user's interaction.

At 2308, the method 2300 may include determining, by the training system, a change in the VR scene and a corresponding change in the one or more AR objects in response to the input. For example, if the user of a VR device laser marks the target, a user of the AR device may be able to see the laser mark. If a user fires a rocket launcher at a vehicle, the other users may see the rocket, the resulting explosion, or both. Moreover, the training system maintains, for each user, a unique perspective relative to the objects or results of the interaction.

At 2310, the method 2300 may include sending a first change from the training system to the one or more VR devices through the network and second a second change from the training system to the one or more AR devices through the network. The training system may send unique VR data to each VR device and unique AR data to each AR device, providing multiple unique perspectives based on the positions of the devices relative to the scene.

In conjunction with the systems, methods, and devices described above with respect to FIGS. 1-23, a training system may provide training scenarios and guidance to instruct and provide practice for a user to develop skills and simulated experience as a JTAC. In some implementations, the training system may include a processor and instructions that, when executed, may cause the processor to generate a VR scene or to present targets superimposed on actual terrain to provide an AR scene. The scene can be presented on any number of devices, including computers, laptops, display screens, VR devices, smart glasses, other devices, or any combination thereof, and from a plurality of different perspectives.

In some implementations, a VR landscape may be stitched together from a plurality of reconnaissance photographs, generated programmatically from a plurality of data points or from CAD drawings, and supplemented with targets. Further, the training system may be configured to teach fundamental principles and guidance for planning, coordinating, and executing close air support during joint operations. In other embodiments or in addition, the training system may be configured to provide training in releasing ordnance, landing procedures, supply drops, surveillance, reconnaissance, airspace de-confliction (between multiple aircraft), other training, or any combination thereof. Other embodiments are also possible.

In some implementations, multiple participants may interact with the training system, concurrently, from different positions, different locations, and with different types of equipment. Some user may utilize VR headsets, others may utilize smart glasses, still others may utilize a computing device, and still others may operate equipment in the training arena. The training system may determine one or more elements within the scene and may provide optical information to the one or more devices according to their respective functionality and position. As one or more users interact with elements within the scene, the training system may automatically update the scene to reflect the various interactions. The optical data provided to each headset may be unique from the perspective of the user.

Although the present invention has been described with reference to preferred embodiments, workers skilled in the art will recognize that changes may be made in form and detail without departing from the scope of the invention.

What is claimed is:

1. A training system comprising:
   a communications interface configured to communicate with one or more devices through a wired or wireless communications link, the one or more devices including a first device and a second device;
   a processor coupled to the communications interface; and
   a memory accessible to the processor and configured to store data and instructions that, when executed, cause the processor to:
   determine a training scene including one or more of an enemy combatant, a structure, and a vehicle;
   determine first device data associated with the first device, the first device data including one or more of first position data, first orientation data, and first attitude data of the first device relative to the training scene;
   determine first image data based on the first device data, the first image data including the training scene including virtual reality (VR) terrain data;
   determine second device data associated with the second device, the second device data including one or more of second position data, second orientation data, and second attitude data of the second device relative to the training scene;
   determine second image data based on the second device data including one or more images for superimposition over real terrain; and
   provide the first image data to the first device and the second image data to the second device.

2. The training system of claim 1, wherein:
   the first device comprises a VR headset; and
   the second device comprises smart glasses.

3. The training system of claim 1, wherein the memory stores instructions that, when executed, cause the processor to:
   receive data related to one or more covers coupled to an electronic device proximate to one or more of the first device or the second device, the data including orientation data, attitude data, and position data;
   determine third image data to overlay a first cover of the one or more covers within one of the first image data and the second image data based on the received data; and
   provide the third image data to the one or more of the first device or the second device.

4. A training system comprising:
   a communications interface to communicate with one or more devices through a network;
   one or more processors coupled to the communications interface; and a memory coupled to the one or more processors to store data and processor-readable instructions that, when executed, cause the one or more processors to:
  generate one or more augmented reality (AR) targets within a training scene, each AR target of the one or more AR targets mapped to a geophysical position within the training scene;
  determine virtual reality (VR) scene data representative of the training scene and including one or more VR targets corresponding to the one or more AR targets;
  send AR data corresponding to the one or more AR targets to a first device through the network; and
  send the VR scene data to a second device through the network;
wherein the training system further comprises:
  a cover configured to be releasably coupled to the first device, the cover comprising:
    a circuit including:
      one or more sensors to determine one or more of position data, orientation data, motion data, or attitude data;
      a circuit processor coupled to the one or more sensors and configured to generate device data for the first device based in part on data from the one or more sensors; and
      a transceiver coupled to the circuit processor to send the device data generated by the circuit processor to the one or more processors of the training system through a network.

5. The training system of claim 4, further comprising processor-readable instructions that, when executed, cause the one or more processors to:
  receive, from the cover of the first device, one or more of position data, orientation data, and attitude data relative to the training scene; and
  determine the AR data based on the one or more of the position data, the orientation data, and the attitude data, the AR data including image data of the one or more AR targets within the training scene from a perspective of the first device.

6. The training system of claim 4, wherein the first device comprises smart glasses communicatively coupled to the communications interface, the first device configured to:
  receive the AR data; and
  superimpose one or more images determined from the AR data corresponding to the one or more AR targets onto terrain according to the geophysical position for each of the AR targets.

7. The training system of claim 4, wherein the processor-readable instructions cause the one or more processors to:
  receive first interaction data corresponding to an action taken by a first user of the first device;
  determine an impact within the training scene corresponding to the action taken by the first user based on the first interaction data;
  determine a geophysical position corresponding to the impact; and
  determine a change in the AR data at the geophysical position corresponding to the impact.

8. The training system of claim 7, wherein the processor-readable instructions further cause the one or more processors to:
  send second AR data corresponding to the change to the first device through the network; and
  send second VR scene data including VR data indicative of the change to the second device through the network.

9. The training system of claim 4, wherein the processor-readable instructions cause the one or more processors to generate a drone interface within one or more of the AR data or the VR scene data.

10. The training system of claim 4, wherein the processor-readable instructions cause the one or more processors to generate a component interface within one or more of the AR data or the VR scene data.

11. The training system of claim 4, wherein the processor-readable instructions cause the one or more processors to communicate with a smartphone through the network to provide the AR data and to receive data.

12. The training system of claim 4, wherein the processor-readable instructions cause the one or more processors to generate the one or more AR targets to provide a joint terminal attack controller training scenario.

13. A system comprising:
  a training system comprising:
    a network interface to communicate with one or more devices through a network;
    a processor coupled to the network interface; and
    a memory coupled to the processor to store data and processor-readable instructions that, when executed, cause the processor to:
      generate one or more augmented reality (AR) targets within a training scene, each AR target of the one or more AR targets mapped to a geophysical position within the training scene;
      determine virtual reality (VR) scene data representative of the training scene and including one or more VR targets corresponding to the one or more AR targets; and
      provide AR data related to the one or more AR targets to an AR headset through the network; and
  a virtual reality (VR) headset communicatively coupled to the training system through the network to receive the VR scene data;
wherein the VR headset further comprises:
  one or more covers configured to releasably couple to the VR headset, each cover of the one or more covers comprising:
    a circuit including:
      one or more sensors to determine one or more of position data, orientation data, motion data, or attitude data;
      a headset processor coupled to the one or more sensors and configured to generate device data for the VR headset based in part on data from the one or more sensors; and
      a transceiver coupled to the headset processor to send the device data generated by the headset processor to the processor of the training system through a network.

14. The system of claim 13, wherein the memory of the training system further includes instructions that, when executed, cause the processor of the training system to:
  receive a plurality of images corresponding to a geographical area;
  determine a three-dimensional representation of the geographical area based on the plurality of images; and
  map the three-dimensional representation to a polygonal matrix to produce the training scene.

15. The system of claim 13, wherein the memory of the training system further includes instructions that, when executed, further cause the processor of the training system to:
  receive data from a transceiver of a first device; and represent the first device within one or more of the AR data and the VR scene data.

\* \* \* \* \*